(12) United States Patent
Waters et al.

(10) Patent No.: US 6,338,088 B1
(45) Date of Patent: Jan. 8, 2002

(54) SERVICE CREATION APPARATUS FOR A COMMUNICATIONS NETWORK

(75) Inventors: Donald George Paul Waters, Woodbridge; Jeremy Pavier, Ipswich; Graham David Turner, Woodbridge, all of (GB); Richard Dewitt Cox, Garland, TX (US); Andrew Timothy Hunter, LaJolla, CA (US); Jeffrey Kevin Rand, Coppell, TX (US); Nicolas Duncan Barker Smith, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/066,459
(22) PCT Filed: Nov. 4, 1996
(86) PCT No.: PCT/GB96/02697
§ 371 Date: Dec. 2, 1998
§ 102(e) Date: Dec. 2, 1998
(87) PCT Pub. No.: WO97/16929
PCT Pub. Date: May 9, 1997

Related U.S. Application Data

(63) Continuation-in-part of application No. 08/538,623, filed on Nov. 2, 1995, now abandoned.

(51) Int. Cl.[7] .............................................. G06F 15/173
(52) U.S. Cl. ........................ 709/226; 709/224; 709/223; 709/229
(58) Field of Search ................................ 709/223, 224, 709/226, 229, 217, 219; 364/146; 707/102, 526, 530

(56) References Cited

U.S. PATENT DOCUMENTS 5,241,588 A * 8/1993 Babson, III et al. ........ 379/201

(List continued on next page.)

FOREIGN PATENT DOCUMENTS

WO WO A 92 11724 7/1992
WO WO A 85 28564 11/1995

OTHER PUBLICATIONS

BT Technology Journal, vol. 13, No. 2, Apr. 1995, Ipswich GB, pp. 80–86, XP000500759 Turner: "Service creation" see p. 82, right–hand column, line 18—p. 84, right–hand column, line 21; figures 2,3.

(List continued on next page.)

Primary Examiner—Zarni Maung
(74) Attorney, Agent, or Firm—Nixon & Vanderhye P.C.

(57) ABSTRACT

A service creation system for a communications network of the intelligent network type has 3 different levels at which service creation activities can be carried out, these being SCE1, SCE2 and SCE3. The use of separate levels allows access to the service creation system to be kept functionally separate for users having different interests in the network. Hence, features which have to be installed at the network element level for a selected service to be available can be created in SCE1. Marketable service features, which give a view of features in that they encapsulate call handling logic thereof together with support and management descriptions of the feature, can be created in SCE2. Service packages, which permit collection of marketable service features to meet requirements of a service together with servicespecific support and management information, can be created in either of SCE2 or SCE3. The service provider at SCE2 creates and tests edit graphs which comprise ordered sequences of marketable service features. These are then made available to the customer at SCE3. Profiles, which list the features relevant to a service for a user and provide data slots for the data necessary to each feature, can be provisioned and modified in SCE3 by the creation of execute graphs from edit graphs. In addition to marketable service features, metafeatures can be embedded in edit graphs. These are similar to marketable service features but have no associated screen information. This allows the user to generate execute graphs from what appears to be a blank screen but in practice has embedded constraints by means of the metafeatures, thus ensuring that the execute graph is still within tested constraints.

11 Claims, 24 Drawing Sheets

U.S. PATENT DOCUMENTS

| | | | |
|---|---|---|---|
| 5,455,853 A | * | 10/1995 | Cebulka et al. ............. 379/201 |
| 5,475,737 A | | 12/1995 | Garner et al. |
| 5,488,569 A | | 1/1996 | Kaplan et al. |
| 5,511,116 A | * | 4/1996 | Shastry et al. ............. 379/201 |
| 5,513,355 A | | 4/1996 | Doellinger et al. |
| 5,517,562 A | | 5/1996 | McConnell |
| 5,566,235 A | | 10/1996 | Hetz |
| 5,572,579 A | | 11/1996 | Orriss et al. |
| 5,579,384 A | | 11/1996 | Seymour |
| 5,592,477 A | | 1/1997 | Farris et al. |
| 5,608,789 A | | 3/1997 | Fisher et al. |
| 5,610,972 A | | 3/1997 | Emery et al. |
| 5,617,422 A | | 4/1997 | Litzenberger et al. |

OTHER PUBLICATIONS

International Switching Symposium, Session C5, Paper 1, vol. 2, Oct. 25, 1992, Yokohama JP, pp. 60–64, XP000429943 Aoyamaet Al.: "A distributed cooperative environment for developing intelligent communication services" see p. 62, right–hand column, line 1—p. 63, right–hand column, line 28; figures 3–6.

IEICE Transactions on Communications, vol. E75–B, No. 10, Oct. 1992, tokyo jp, pp. 969–977, xp000324830 niitsu et al.: Computer–aided stepwise service creation for the Intelligent Network: see p. 970, right–hand column, line 13—p. 973, left–hand column, line 24; figures 3–6.

AT&T Technical Journal, vol. 70, No. E/4, 1991, Short Hills US, pp. 58–71, XP00271088 Morgan et al.: Service creation technologies for the Intelligent Network: cited in the application.

* cited by examiner

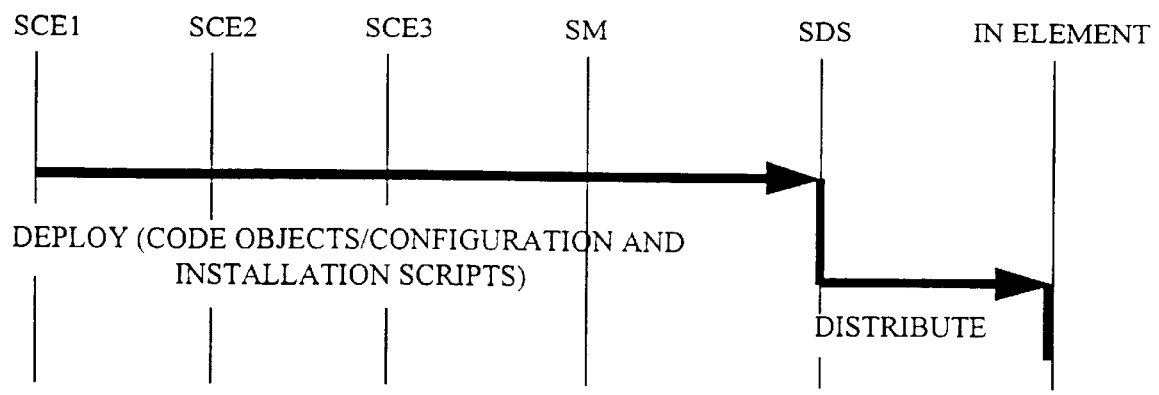
FIGURE 7
FIGURE 8
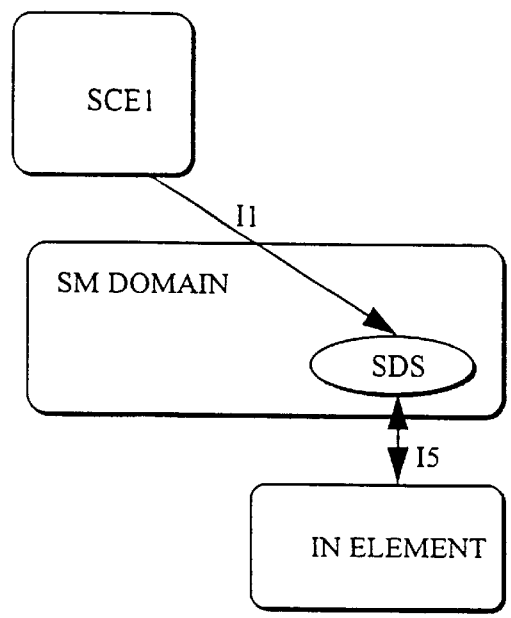

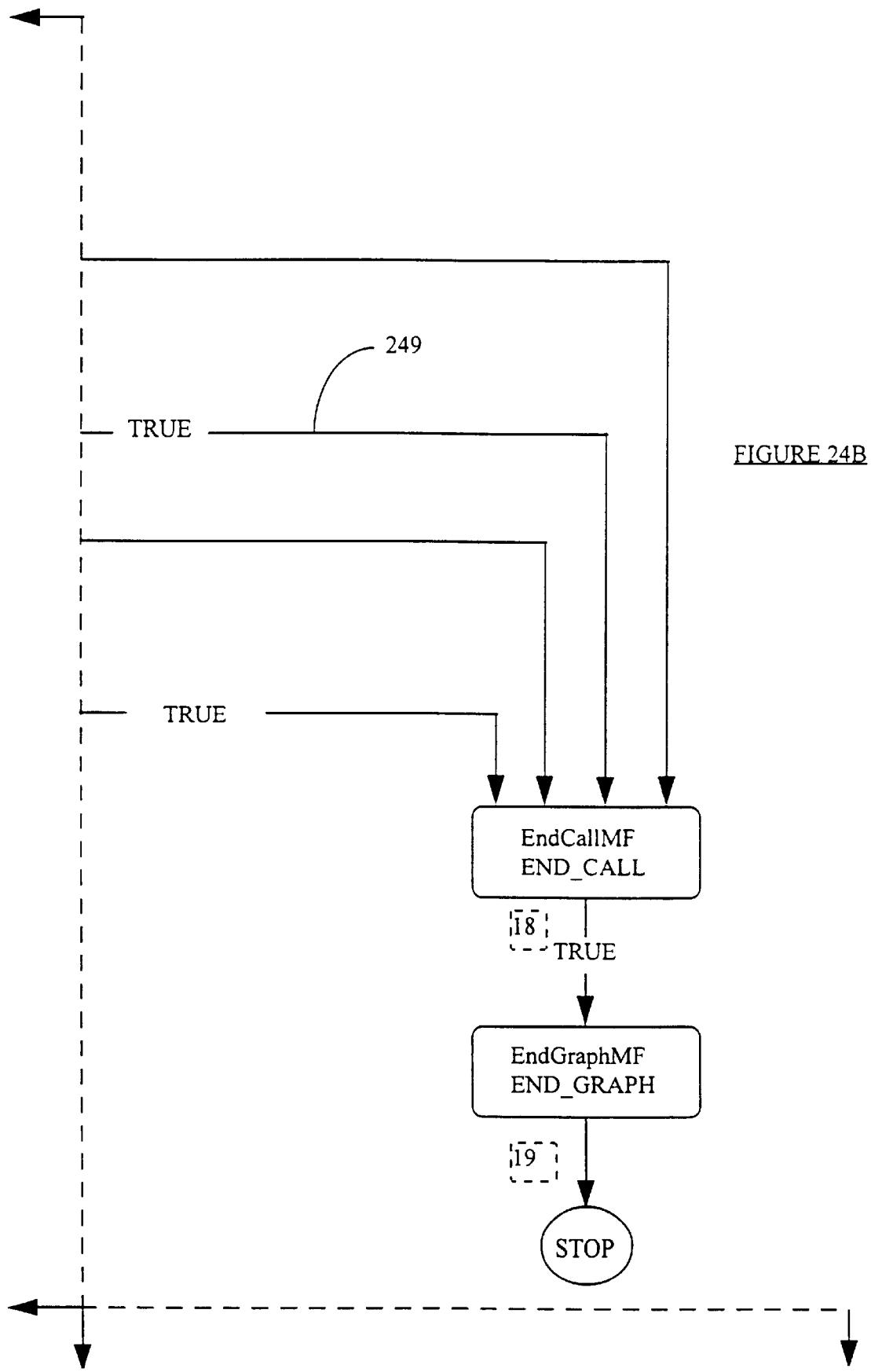

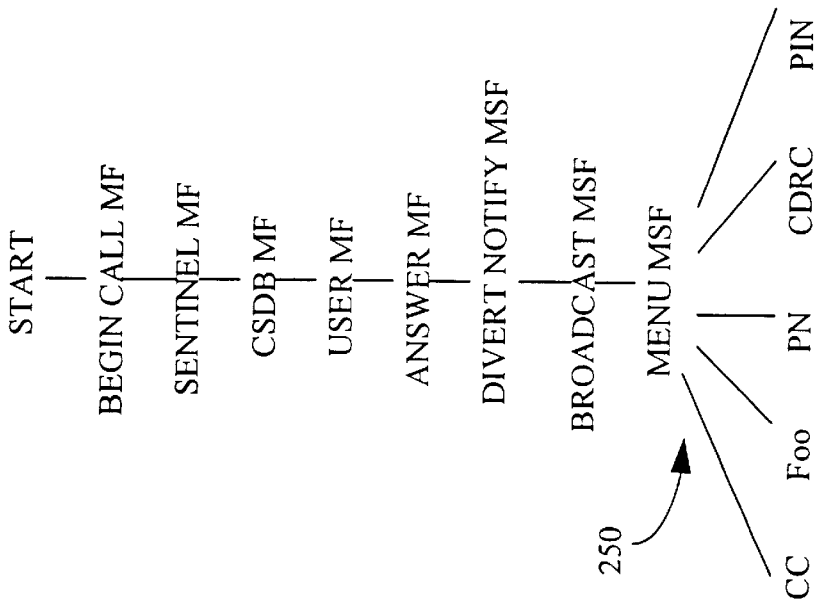
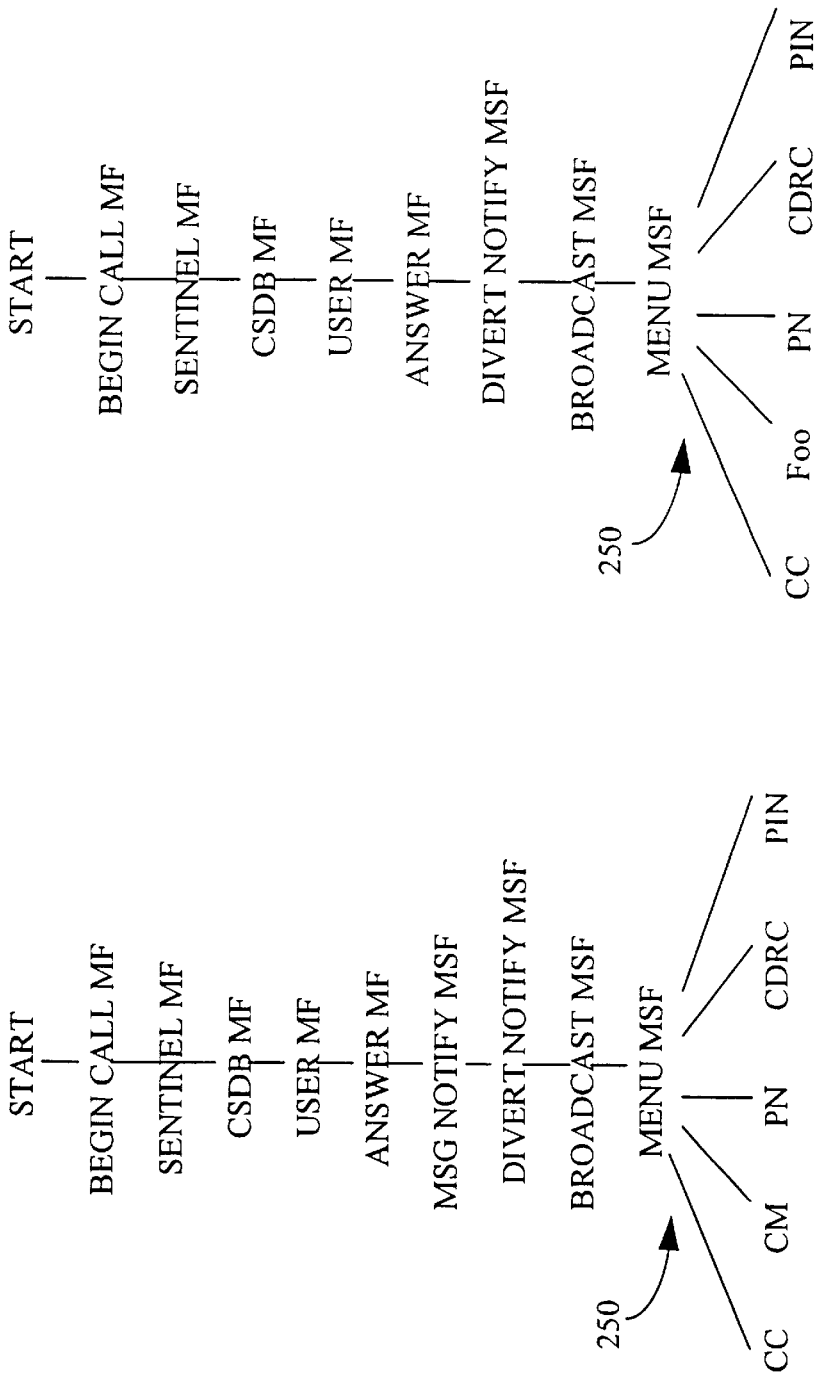
CC = CHARGE CARD
CM = CALLMINDER
PN = PERSONAL NUMBERING
CDRF = CALL DIVERSION REMOTE CONTROL
PIN = PERSONAL IDENTIFICATION NUMBER

SERVICE CREATION APPARATUS FOR A COMMUNICATIONS NETWORK

RELATED APPLICATIONS

This application is a continuation-in-part (under 35 USC §120/365) of U.S. application Ser. No. 08/538,623 filed Nov. 2,1995, now abandoned.

BACKGROUND OF THE INVENTION

1. Field of the Invention

The present invention relates to service creation apparatus for a communications network, and finds particular application in intelligent networks.

2. Related Art

As communications networks have developed, there has been a major increase in the number and variety of services which a network operator can deploy. It is a key commercial issue for network operators to be able to create and deploy new services quickly and efficiently. The intelligent network form of architecture, wherein intelligence is provided at a variety of points in or associated with a communications network rather than primarily at a switch or exchange as has been the case in the past, has been developed at least partly to give the network operator the facility to provide new services with speed and flexibility.

A key principle in intelligent networks (IN) is the separation of software which controls basic switch functionality, such as setting up switch paths, from the software that controls call progression. Referring to FIG. 23, this has been achieved in known INs by enabling network exchanges 230 to recognise calls which require modified call progression and to suspend ordinary call processing. The decision to suspend call processing is based on the meeting of pre-specified trigger criteria, for example dialling digits, line condition or time of day, at certain points during the call. This can be described as "service switching point (SSP)" functionality being provided at the network exchange 230.

On recognising a call needing an IN-based service, the SSP functionality refers to a service control point (SCP) 231 and call progression is thereafter controlled by intelligence outside the basic network exchange 230 to provide whatever service the call required.

An aspect of an intelligent network architecture which is particularly relevant to the provision and modification of services is the service creation and deployment system. Attributes that are particularly attractive in an IN to accelerate the creation of new services are:

i Functional separation—this is the separation of basic core functions of real time call switching from the customer and service specific aspects, so that the latter can be changed more easily, which is mentioned above.

ii Portable software environment—enabling services to be developed once and then run on SCPs 231 provided by different suppliers.

iii Generic building blocks—building services from common modules allows considerable reuse and hence speed of development.

iv Service logic programs (SLPs)—a simple language for specifying the linkages between building blocks. SLPs are usually produced by service creation tools.

v Graphical service creation tools—these tools enable services to be rapidly created, by 'on screen' manipulation of icons which represent the generic building blocks.

vi Service and network simulators—when a service has been created, it can be simulated to check its functionality, performance, cost, etc.

vii On-line deployment—when a service is ready for deployment it can be electronically sent to the network and the appropriate management systems, from the service creation tool.

Services are created, in a known type of service creation environment 232, from the generic building blocks by specifying the sequences of these blocks and any conditional linkages between the blocks. This specification is frequently known as a script or service logic program (SLP) and is usually generated by a service creation tool. When this SLP is deployed into the network it needs to be 'executed'. This is done in a Service Logic Execution Environment (SLEE) which often sits in the SCP 231. The module for doing this execution itself is often called a Service Logic Interpreter (SLI) because many IN implementations use an interpreted language for their SLPs. It does not have to be an interpreter however and can more generically be called for instance a Service Engine. This might support interpreted or compiled, and possibly other forms of SLP.

Together with the Service Creation tools themselves, the use of re-usable generic building blocks is important in service creation. In the general world of computing much work has been done on trying to achieve significant software reuse because the benefits are significant. For example, reusing a program three times effectively triples productivity and furthermore on the second and subsequent time it is used, the lead time can be virtually zero.

Despite these benefits, general software reuse is still rare because it is difficult to realise. However, within the fairly closed domain of the SCP, where the discrete operations of the underlying network are well understood, it is possible to build generic pieces of software to drive these underlying operations. These are the building blocks which can be called in many different sequences to provide the diverse range of IN services.

A typical building block might be "time of day routing". This building block would check the data in a user's profile which may state that after 6:00 pm calls to a particular number are diverted to a night-watchman. The "time of day routing" building block would then check the current time and route the call appropriately.

SLPs can be delivered to the SLEE via a Service Management System (SMS) 233. This is generally responsible for service management, deployment, and provisioning of customers and updating customer specific data held on the SCP 231 and the Service Data Point (SDP) 234.

It is advantageous that service creation can be carried out not only by a network service provider but also by subscribers or users themselves. Service Creation technology enabling different entities to develop or modify services is described in the publication "Service Creation Technologies for the Intelligent Network" by M J Morgan et al, published in the AT&T Technical Journal Volume 70, Summer 1991, No. 3/4, New York U.S.

SUMMARY OF THE INVENTION

In embodiments of the present invention, there is provided a service creation and provision system for a communications network in which communications services can be created or modified by screen-based manipulation of ordered sequences of units of code, the system providing a service by running such an ordered sequence of units of code in accordance with an execute graph, wherein the system comprises:

i) an interface to stored units of code;

ii) means to select a set of units of code from those stored;

iii) means to create or modify an edit graph, the edit graph determining at least in part the ordered sequence associated with a set of units of code for the provision of a communications service; and iv) means to associate an edit graph with visual information for use by a user on a graphical user interface in editing or modifying the edit graph to produce an execute graph, and means to supply the edit graph together with the visual information to the graphical user interface;

wherein the means to supply the edit graph together with visual information is adapted to supply at least one edit graph without visual information such that an execute graph can be produced from the edit graph without the edit graph being visible, or being only partially visible, to the user.

An execute graph may then be used by a service engine of the system in running a service logic program in the provision of a service.

Embodiments of the present invention may be particularly useful in a multi-level service creation environment, such as a known type of three level service creation environment. Each level provides different functionality and is for the use of a different set of users, for instance for the network provider for installing units of code to the network, for the service provider to create and modify services, and for the customer to create, modify or instantiate actual services for their users.

These levels may be designated for instance SCE1, SCE2 and SCE3. The use of separate levels allows access to the service creation system to be kept functionally separate for users having different interests in the network. Hence, features which have to be installed at the network element level for a selected service to be available can be created in SCE1. Marketable service features, which give a view of features in that they encapsulate call handling logic thereof together with support and management descriptions of the feature, can be created in SCE2. Service packages, which permit collection of marketable service features to meet requirements of a service together with service-specific support and management information, can be created in either of SCE2 or SCE3. Profiles, which list the features relevant to a service for a user and provide data slots for the data necessary to each feature, can be provisioned and modified in SCE3.

In preferred embodiments of the present invention, therefore, each of the levels is provided with means to generate different respective types of software entity, a first of said levels having means to generate service application features which comprise code objects which can be deployed in elements of the network by means of a service distribution system, and a second of said levels having means to generate marketable service features, these comprising call-handling logic of a service application feature encapsulated with support and management descriptions for that feature.

The second of the levels may advantageously have means to store and output service packages, these being software entities having an association function for identifying and associating marketable service features with specific services available by means of the communications network.

A third of the levels may also have means to generate service packages, and means to generate or modify profiles, a profile comprising a list of one or more features that a user needs in selecting a service of said network, and means to store data relevant to each feature such that the feature can operate successfully in the context of the selected service.

A further advantage of a multi-level system of this type is the variation in control mechanisms which can be provided. For instance, control can be exercised at SCE2 of facilities, mechanisms or the like available to users operating at SCE3. This is where embodiments of the present invention have particular application in that edit graphs can be created or modified at SCE2 and supplied to SCE3 for use by the customer in generating execute graphs. By hiding selected aspects, even all, of an edit graph, it is possible to give the customer wide apparent latitude in generating an execute graph while still constraining them by use of a hidden or partially hidden edit graph which prevents them from generating and then running an untested version of a communications service.

BRIEF DESCRIPTION OF THE DRAWINGS

A service creation system according to an embodiment of the present invention is described below, by way of example only, with reference to the accompanying Figures in which:

FIGS. 7 to 18 show example workstrings and their associated architectural activities;

FIG. 25 shows an example execute graph, associated with the edit graph of FIG. 24;

DETAILED DESCRIPTION OF EXEMPLARY EMBODIMENTS

Figure 1:
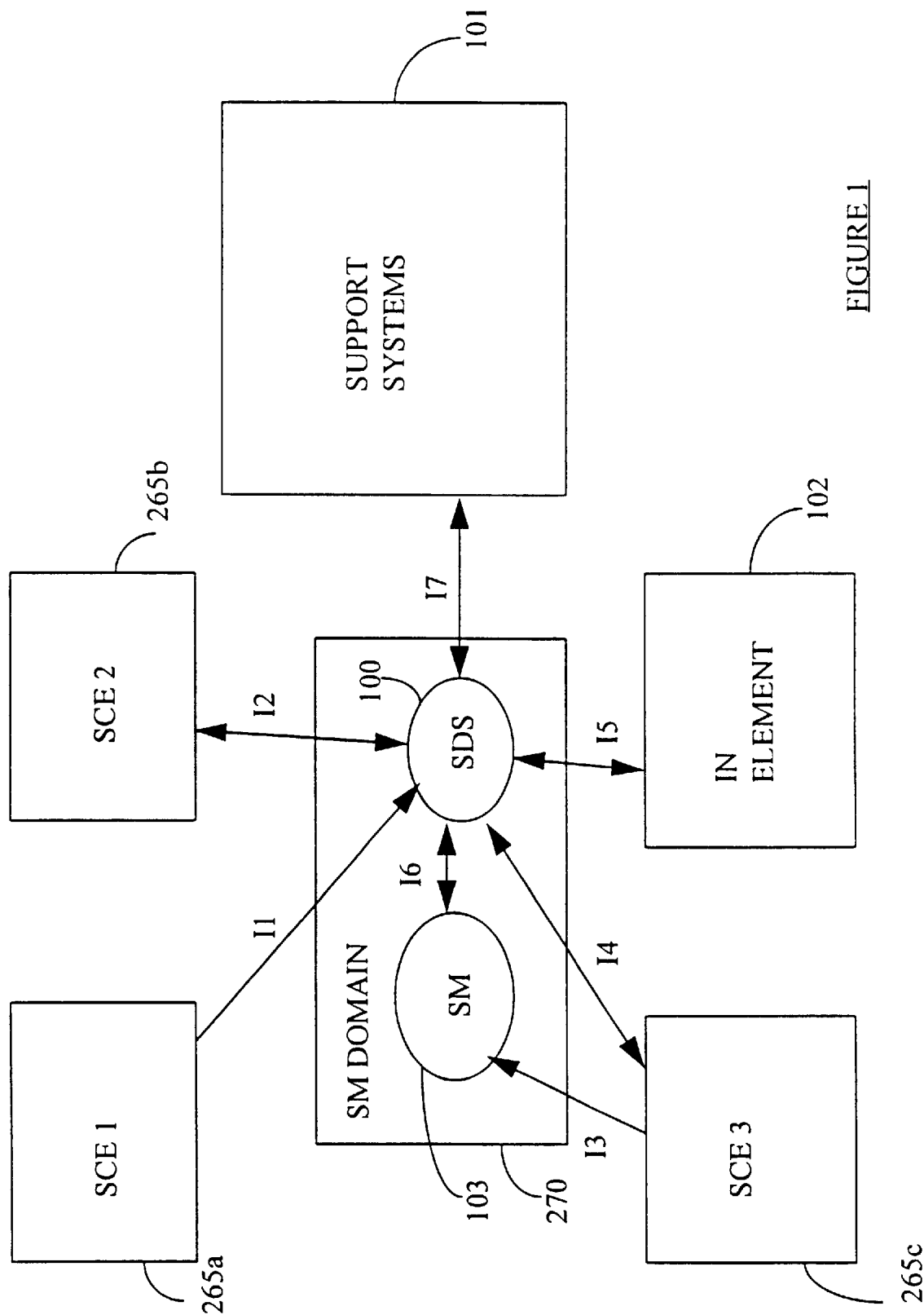
FIG. 1 shows a schematic overview of the service creation architecture.

In the following description, a number of acronyms are used in place of the relevant full titles of elements, processes and the like. These can be interpreted from the following glossary:

GLOSSARY

API Application Programming Interface
CM Configuration Management
CPE Customer Premises Equipment
Foo A term known in computing technology as a general representation of a computing function
GSC Generic Service Component
IN Intelligent Network
IVRU Interactive Voice Response Unit
KTN Key to the Network
MSF Marketable Service Feature
SAF Service Application Feature
SAP Speech Applications Platform
SCE Service Creation Environment
SCP Service Control Point
SDS Service Distribution System
SLA Service Level Agreement
SLEE Service Logic Execution Environment
SM Service Management
SN Service Node
SP Service Package

1. INTRODUCTION

1.1 Scope

The scope of the following description addresses the area of Service Creation in that it defines a logical architecture whereby Service Creation requirements can be delivered on Intelligent Networks.

It should be noted that any Service Management system configured for actual use is likely to have much greater scope and responsibilities than those described here. However, service management systems are known and, for the purpose of the present invention, need only be compatible with the service creation architecture described. It is not therefore the purpose here to describe completely and accurately a full Service Management system.

The data architecture that underpins this Service Creation Architecture is described in Section 5. However, the development of this data architecture and the ideas behind the specific interfaces (3.1) raise issues concerning the implementation of data distribution. The discussion of the issues is set out in Section 7.

1.2 Terminology

For the purposes of this description the term customer will refer to a corporate purchaser of service capabilities. The term user will refer to an individual employee of a customer who has service capabilities provided by the customer. Hence a customer has users.

For the purposes of this description the terms SCE1, SCE2 and SCE3 will be used throughout. They are used to described integrated software toolsets that provide Service Creation capabilities at differing architectural levels.

The term IN Element is used as a logical grouping to refer to Intelligent Network computing platforms such as Service Control Points (SCPs), Service Nodes (SNs) and Intelligent Peripherals (IPs). It should be understood that computing platforms used in different types of IN architectures, for instance perhaps with intelligence less centralised than in an IN based on SCPs, including distributed processing platforms, are also covered by the term "IN Element".

1.3 Objectives

The objectives of the description are to:
define the overall Service Creation Architecture,
specify a high-level view of the logical systems design which will be subsequently provided by physical systems.
identify and explain Service Creation entities (e.g. Marketable Service Features, Generic Service Components, etc.),
identify interfaces,
identify work packages and application entities,
define a baseline architecture for Service Creation for migration of Service Creation into large scale public networks.

2. SERVICE CREATION ARCHITECTURE OVERVIEW

2.1 Overview Description

The overview of the Service Creation Architecture is defined by the relationships that are understood to exist between existing or proposed entities such that new services and features may be rapidly deployed and provisioned, using automated processes and interfaces. To explain the relationships it is necessary to describe a Service Creation process, with reference to FIG. 1.

Service Applications and reusable features are developed at SCE1 265a as tested code. This code is delivered (via interface I1) to a Service Distribution System (SDS) 100 as repository, which stores and deploys (via interface I5) the code onto targeted IN Elements 102 (SCPs 231, SNs, IPs 235, etc.).

SCE2 265b uses the SDS repository 100 (via interface I2) to build Marketable Service Features (see §5.2) and Service Packages (see §5.3).

Service Packages are delivered to Service Management functionality (SM) 103 from the SDS repository 100 (via interface I6) in the Service Management Domain 270 and to SCE3 265c (via interface I4) for provisioning.

Service Packages, or parts thereof, are delivered to Support Systems (via interface I7) 101 to configure them for a new service.

SCE3 265c is used to create Profiles (see §5.4) which are delivered to SM 103 (via interface I3) for validation.

Validated Profiles are passed to the SDS 100 (via interface I6) and distributed to the relevant IN Elements 102 (via interface I5).

Interface I4 is also required to support invalidated Profile updates. These are more commonly known as Network-side updates. However, under this architecture it should be emphasised that any form of Profile update emanates from SCE3 265c. Thus any update capability that exists within a service, on an IN Element 102 or within customer premises equipment (CPE) is recognised as being SCE3 capability (see "2.2 Constraints b)", below).

2.2 Constraints a) A network operator's Service Management system 270 will exist either as a distinct platform or distributed across a range of platforms.
b) SCE3 265c represents provisioning capabilities either as distinct physical systems interfaced directly to a Service Management system 270, collocated as part of a Service Management system 270 or capabilities within network elements 102 to support network-side updates. Large networks will probably require SCE3 265c to be all of these. SCE3users will usually comprise a network operator's Support people, customers and users.

c) SDS 100 (see §4.4.2) represents a repository and distribution system, possibly distributed, part of a Service Management system 270 or requiring a separate platform. This will depend on the size of the target network and the performance and cost requirements associated with that network implementation.

d) IN Elements 102 will comprise network-based computing facilities such as Service Control Points (SCPs) 231, Service Nodes (SNs) (not shown) and Intelligent Peripherals (IPs) 235 capable of supporting service applications and related customer datastores.

e) Interfaces and management systems will provide totally automated service deployment and provisioning across generic systems. The Service Creation architecture designs, and subsequent workstring analyses, proceed on this basis.

3. SERVICE CREATION ARCHITECTURE

Figure 2:
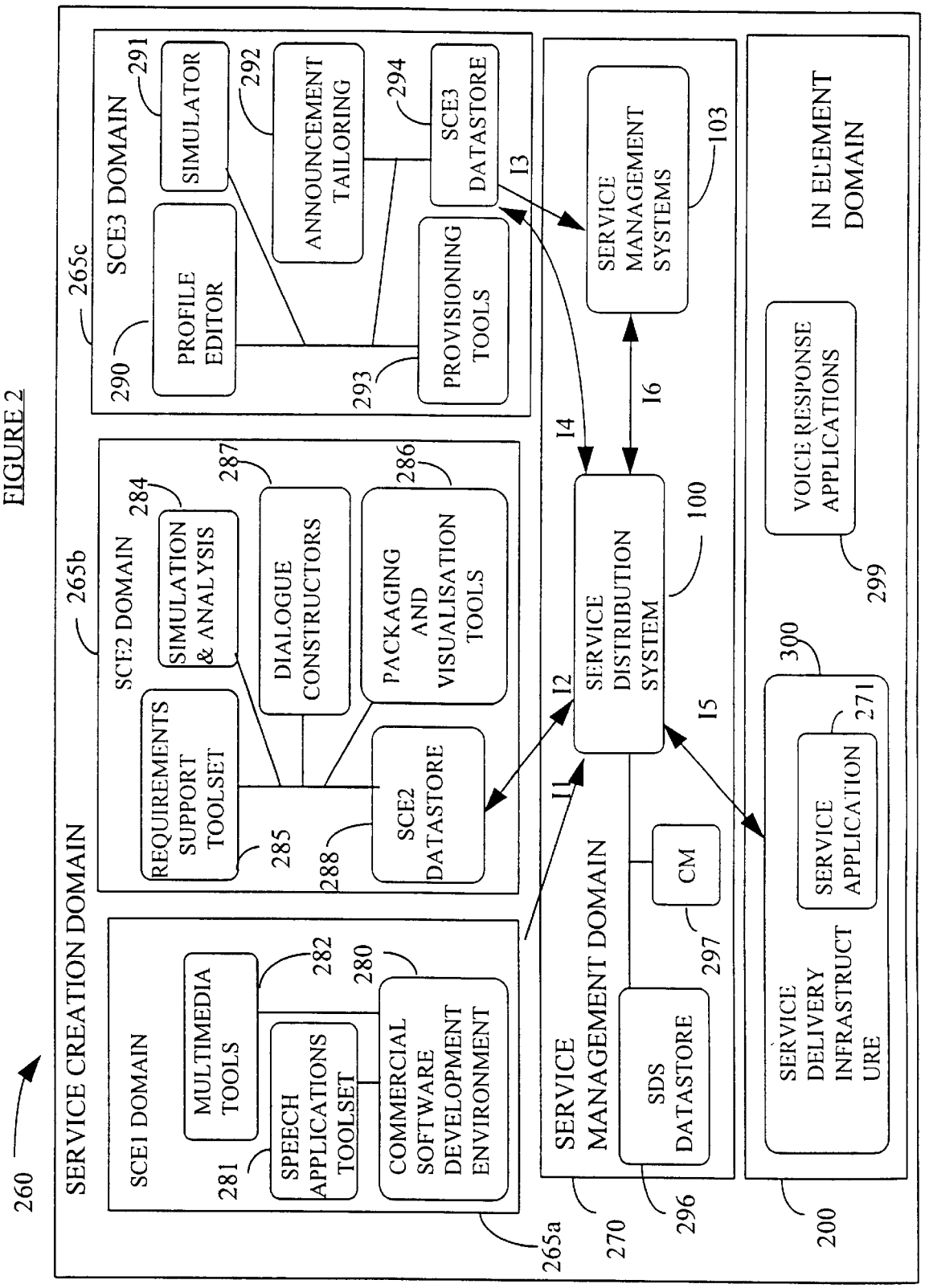
FIG. 2 shows a service creation domain and process relationships, relevant to the architecture of FIG. 1.

FIG. 2 shows a more detailed expression of the Service Creation Architecture. The diagram describes the relationship between major functional areas and the positioning of major subsystems concerned with the development of speech-based services. The interfaces with directional arrows correspond to the interfaces shown in FIG. 1 and listed in §3.1 (except Interface I7). Connecting lines between processes within domains represent some form of integration between software entities. This could be in the form of interfaces, file transfer, interprocess communications or application integration (internal data sharing).

The architecture is represented in terms of domains and processes rather than systems. Although the Service Creation Domain 260 is subdivided into five logical domains, three SCE Domains 265, a Service Management Domain 270 and an IN Element Domain 200, the processes that reside within these domains will operate across a range of platforms and environments.

The three SCE Domains 265a, 265b, 265c are logically separated to distinguish between the different requirements and types of usage and user that must be satisfied. These can be categorised:

| Domain | Users | Usage |
| --- | --- | --- |
| SCE1 265a | Service Provider Developers | Development of applications and features at code level for deployment in IN Elements 102. |
| SCE2 265b | Service Provider Developers Service Provider Marketing Service Provider Testers | Developers of Products and Services from reusable components to meet Marketing Requirements. Simulation and Analysis of prototype Services. Customer specific tailoring prior to service delivery. |
| SCE3 265c | Service Provider Developers Service Provider Support Operator Services Customers Users | Provisioning and Tailoring of Services and Service Instances during service operation. |

-continued 3.1 Interfaces

| Interface Number (Refer to FIGS 1 & 2) | Interface Name | Interface Description |
| --- | --- | --- |
| I1 | SCE1-SDS I/F (Code) | Data interface between SDS 100 and SCE1 265a to enable the deployment of applications, Service Application Features and Generic Service Components from SCE1 265a to SDS 100 and onward to IN Elements 102. |
| I2 | SCE2-SDS I/F (Marketable Service Features/Service Packages) | Bi-directional data interface between SDS 100 and SCE2 265b. SCE2 picks up SAF/GSC capabilities from SDS repository 100 and develops MSFs, MFs and SPs based on this information. MSFs and MFs are stored on SDS 100 from SCE2 265b. Service Packages are delivered to SDS 100 from SCE2 265b where they are stored and deployed on appropriate IN Elements 102. |
| I3 | SCE3-SM I/F (Profiles) | Data interface between SCE3 265c and SM 103 to enable the provisioning and tailoring of user/customer data necessary for the operation of network-based services. May also include graphics terminal emulation to allow customers to drive SM provisioning screens. Data is passed in the form of Profiles or Profile updates which must be validated by SM 103 before distribution. |
| I4 | SDS-SCE3 I/F (Service/Package/ Profiles) | Bi-directional data interface delivering Service Packages to SCE3 265c to describe new services and accepting, from SCE3 265c, Profile updates (not requiring SM validation). In addition, new SAFs will be delivered to SCE3 265c across this interface, to support provisioning validation and SCE3 simulation capabilities. |
| I5 | SDS-IN Element I/F (Profiles/Code) | Bi-directional data interface between SDS 100 and IN Element 102 to enable the deployment and distribution of applications and features, and update provisioned data. Service data is passed in the form of Profiles and Profile updates. Development is achieved by the distribution of Service Packages. |
| I6 | SM-SDS I/F (Profiles/Service Packages) | Bi-directional data interface from SM 103 to SDS 100 to deliver provisioned and updated customer data for distribution to IN Elements 102. Data is passed in the form of Profiles and Profile updates. SM 103 is also recipient of Service Packages when deployed from SDS 100. |
| I7 | SDS-Support Systems | Logical grouping interface between the Service Distribution Systems 100 and one or more Support Systems 101 such as Billing, Fault Control, etc. This interface will be realised by a range of interfaces determined |

-continued by specific designs. The data that is passed across these interfaces will be determined by the flexibility, configurability and "service creatibility" of these support systems 101. Control and specification of these interfaces does not lie within the Service Creation domain 260.

4. DOMAIN DESCRIPTIONS

Figure 3:
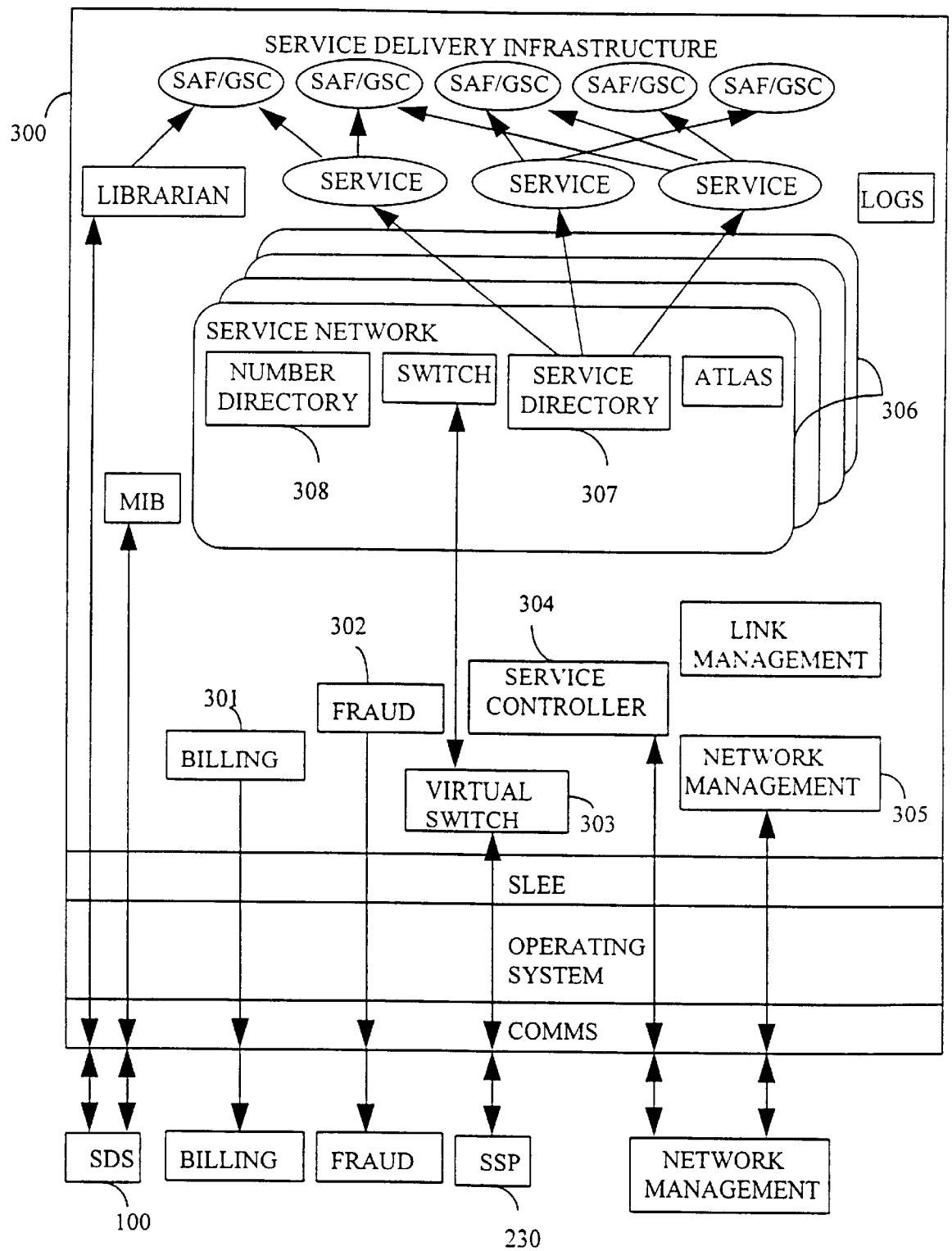
FIG. 3 shows a service delivery infrastructure and its relationship with other platform components on a typical intelligent network element.
Figure 4:
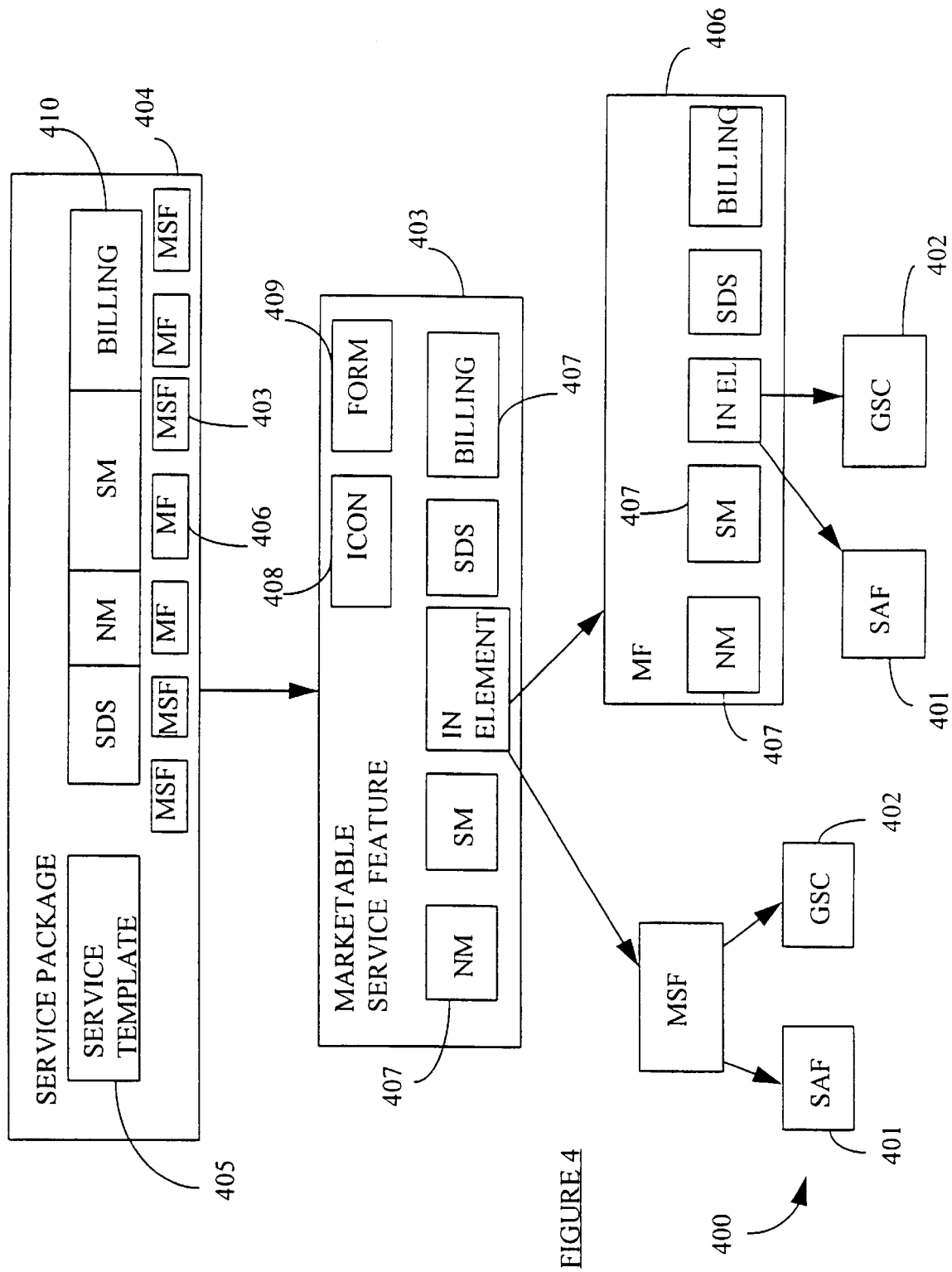
FIG. 4 shows a schematic service creation data architecture for use in the architecture of FIG. 1.

The various domains are shown in FIG. 2 and Section 4 should be read with reference thereto, as well as to FIGS. 3 and 4.

4.1 SCE1 Domain 265a

SCE1 represents the fundamental layer of service creation activity. SCE1 developers are responsible for developing Service Applications on IN Elements 102 and the Service Delivery Infrastructure 300 into which these applications will be deployed. Service Applications will be delivered in the form of reusable Service Application Features 401. These will comprise fully developed and tested code. SCE1 is the only place in the architecture that develops code into the network.

4.1.1 Commercial Software Development Environment 280

This system represents an integrated collection of software tools to support the development lifecycle. These tools will primarily be commercially available editors, compilers, configuration management systems, analysis, design, test and documentation tools. They are commonly based on conventional computer-aided software engineering (CASE) tools. Some of these development environments will be supplied by vendors to support development on specific IN Elements 102. At the very least SCE1 265a must provide an integration of deployment/testing tools to support dynamic deployment.

In addition to down-loading actual building blocks to the target systems, SCE1 tools will also pass a representation of the building block to the SCE2 domain 265b. This representation covers:

A textual description of the block, for information purposes and as help text.

Its on screen presentation, i.e. the icon that schematically represents the function.

The rules governing interactions with other building blocks.

The data associated with the building blocks. These will eventually need to be provisioned for a particular customer.

4.1.2 Speech Applications Toolset 281

Software development tools that support the construction of speech-based dialogue features and services. These tools will generally be specific to the target platforms that are expected as IN Elements 102 and may well be purchased with the platforms or developed internally to support particular platforms.

4.1.3 Multimedia Tools 282

Clearly, to support provision of multimedia services, services that support images, video and special fax capabilities will be required and consequently appropriate service creation tools and utilities will be required to support them.

4.2 SCE2 Domain 265b

SCE2 265b can be defined as a Marketing, Testing and Packaging activity. The specific scope and range of activities taking place within SCE2 265a can be modified but they will clearly need to support the Service Creation process.

The tools 284, 285, 286, 287 at SCE2 265b will be used by product line developers, or their agents, and will need the following overall functionality:

Assemble a basic service, by dragging and dropping icons on a screen and linking them.

Define how much of the service flow can be altered at SCE level 3, i.e. by a customer. The rest of the service is then effectively fixed for all customers.

Pre-set some of the data associated with the service with default values and again define which of these a customer will be allowed to overwrite.

4.2.1 Requirements Support Toolset 285

It is desirable to automate the capture of Marketing Requirements and to map them onto Service Definitions. This enables more efficient reuse across the entire development lifecycle. SCE2 265b will use automation tools to support its requirements capture activities.

4.2.2 Packaging and Visualisation Tools 286

It is at SCE2 265b that Service Application Features 401 will be associated with Marketable Service Features 403 (see §5.2) containing the Service Management, Network Management, SDS and Billing components 407 necessary to support the provisioning and use of the feature in a live network. It is at SCE2 265b that MSFs 403 and MFs 406 are created. Marketable Service Features 403 and Metafeatures 406 will also be packaged into Service Packages 404. SCE2 265b can create or define provisioning screens for SM 103 or SCE3 use on the MSFs 403 encapsulated within Service Packages 404, can create or define provisioning screens for SM 103 use on the MSFs 403 and MFs 406 encapsulated within Service Packages 404, identify usage/charging characteristics specified by Service Level Agreements and provide feature editor rules for SCE3 that resolve feature interactions. In this respect it should be noted that the Service Packages 404 constructed at SCE2 will control the configuration of SCE3 processes that use them.

4.2.3 Simulation and Analysis 284

Service Packages 404 created at SCE2 265b need to be capable of being simulated such that behavioral characteristics, traffic loading, performance and revenue forecasts can be made to determine customer acceptance, network impact and economic viability of services created at this level.

4.2.4 Dialogue Constructors 287

SCE2 users should be able to construct service or customer-specific dialogue and announcements for inclusion in Service Packages 404. These will be constructed by service-level provisioning of reusable announcement/ dialogues within MSFs 403. These dialogues construction tools should be able to support a range of input mechanisms (analogue and digital) and a variety of storage formats (IN Element-specific). It may also be necessary for these tools to support sophisticated editing and signal processing functions for the construction of speech announcements from reusable fragments.

4.2.5 SCE2 Datastore 288

Local datastore for holding work in progress. All master data concerning SAFs 401, MSFs 403, MFs 406 and Service Packages 404 is held in the SDS Datastore 296 (see below) and retrieved by SCE2 users.

4.3 SCE3 Domain 265c

SCE3 activities are directly concerned with provisioning and tailoring. It is seen that there are two distinct types of provisioning at SCE3; behavioral and data provisioning. Behavioral provisioning is the manipulation of the service data in such a way as to effect a change in the logical operation of the service. Data provisioning is the classically recognised type of provisioning, normally undertaken by Service Management Systems, whereby the data associated with a particular feature and/or user can be changed directly and the network updated appropriately.

The tools at SCE3 will therefore be used by customers (or users) directly, by network operators acting on behalf of specific customers or by marketing people acting on behalf of groups of customers or users. To support these various scenarios, the SCE3 functionality can be provided on a range of hardware, from personal computers (PCs) to sophisticated Unix workstations.

The general functions supported through an SCE3 domain 265c are:

Tailor the service—within the constraints set at SCE2, the customer or user may be allowed to change the flow or structure of their particular version of the service.

Provision some of the service data with customer specific values.

4.3.1 Profiling Editor 290

Customers are provided with a Service Package 404, referencing a Service Template 405 that represents a minimum profile that, when provided, will give a complete, fully featured service guaranteed to run. Customers can create a hierarchy of sub-templates from this master template according to the needs of their users. The tools provided allow customers to specify which user groups have access to which feature and how those features interact, within the constraints set by the feature editor rules specified at SCE2 265b (see above). The Profiling Editor allows the SCE3 user to view the logical ordering of their features within a Service and, under the aforementioned constraints, modify that sequence graphically. Customers will be able to create and assign particular Profiles, and hence feature sets, to individual users.

4.3.2 Simulator 291

Supporting the Profile Editor 290 is a simulation toolset 291 that allows customers to see the flow of their services and verify their behavior. Customers will have the opportunity to simulate graphically a range of call scenarios that will allow them to assess whether their logically correct services behave as required.

4.3.3 Provisioning Tools 293

Customers can provision Profiles for each individual user, on the basis of the templates they have developed. At the user level, each user will have access to their own profile, either directly or via some form of remote support provided by the customer or the service provider. This will be a view onto their own collection of features that will present the appropriate provisioning screens allowing them to update their profiles, constrained only by access permissions and authorities specified either by the service provider (for network protection issues) or the customer (for whatever reasons they may choose).

4.3.4 Announcement Tailoring 292

Announcement tailoring tools 292, in co-operation with provisioning tools 293, may be used to offer some level of local personalisation of announcements in features or services that support this. Examples are the selection of corporate or departmental announcements for voice menu features or personalised messages for individual call completion services (Voice Mail, etc). These tools may operate as selection systems for sets of predefined messages or even allow local recording of speech for deployment in specialised network platforms such as interactive voice and speech application platforms.

4.3.5 SCE3 Datastore 294

Local persistent store. Will accept and configure SCE3 265c on receipt of Service Packages 404. Used for local store of template hierarchies and incomplete Profiles. May also be responsible for customer's local store of current Profiles (see Section 7).

4.4 Service Management Domain 270

4.4.1 Service Management System 103

In this architecture the Service Management System 103 is required to manage and support customer services in areas other than the provisioning and tailoring of Profiles. The Service Management System will be responsible for Order Handling, Service Level Agreement enforcement and Service control (enabling, suspending and withdrawing Service). In addition, the logical interface to Support Systems 101 (Interface I7, shown on FIG. 1) may well be handled through the Service Management System 103 such that Fault Management, Charging, Pricing, Network Management, Element Management and Data Distribution, etc will be visible, configured and controlled through this system.

4.4.2 Service Distribution System 100

The Service Distribution System (SDS) 100 acts as the Service Creation repository. It stores and manages all code delivered by SCE1, distributing it to the appropriate IN Elements 102 for installation and deployment. It makes network capability information (in the form of SAFs/GSCs) available to SCE2 so that Marketable Service Features (MSFs) 403 and MFs 406 can be developed from these and other building blocks. SDS also acts as the repository for these MSFs 403 and MFs 406 and the Service Packages that are constructed from them. This ensures that different instances of SCE2 265b will have maximum reuse ability regard to previously developed components and thus shortened development times.

As a data distributor SDS 100 delivers profiles to IN Elements 102 according to network topology and customer distribution configurations dictated by operational systems such as Service or Network Management. The configuration data available to the SDS 1 00 decouples the logical service networks 306 from the physical network. In this way additional network switching or control capabilities can be introduced without requiring wholesale updates and reprovisioning on Service Management systems.

SDS 100 performs a key role in servicing network-side updates, such that SCE3 systems can be registered as IN Elements 102 for data distribution. Consequently network-side updates can apply at any IN Element 102 and SDS 100 will ensure that all dependent systems receive profile updates. This allows developers to present data to a common interface across the network. The consequences of this architectural decision are that SCE3 customers can update profiles or have their resident profile data updated from the network. This is interpreted as IN Elements 102 having an SCE3 capability wherever service applications require a network-side update faculty from CPE (Customer Premises Equipment).

SDS 100 will maintain a static master datastore 296 for the IN Elements 102 it supports. This datastore 296 will contain sufficient data such that all Profiles are capable of being rebuilt and reprovisioned in the event of data corruption or loss within IN Elements 102.

4.4.3 SDS Datastore 296

The SDS Datastore is a persistent storage application containing the network master profile store. In addition, this store contains network configuration and data associated with IN Elements 102 and customer distribution across those IN Elements 102. All profile data updates will be mastered here and SDS 100 will distribute changes down to IN Elements 102 and up to dependent SCE3 Datastores 294. As the Service Creation repository the SDS datastore 296 will contain all code deployed by SCE1, all MSFs, MFs and SPs from SCE2 265b, available for access, under configuration management control, from instances of SCE2 to provide rapid service Creation and component reuse capabilities. This arrangement naturally will have performance and dimensioning implications on both the datastore application and the platform on which SDS 100 will reside.

4.4.4 Configuration Management 297

A configuration management system 297 is necessary to administrate the repository functions of the SDS datastore 296. As the central repository for all network-deployed code, Marketable Service Features 403, Metafeatures 406 and Services Packages 404 it is essential that Service Creators at SCE1 and SCE2, as well as network operational people, have access to all versions of deployed Services and Features, if only for rollback security. This is especially important if services and features are to be deployed dynamically from several sources, and represents well-understood software development best-practice.

It is recognised that configuration management systems will probably also reside within the SCE domains 265 (particularly SCE1 and SCE2), to maintain administrative control of local "work in progress", build and release management. However these systems will not be expected to carry the burden of maintaining network CM control. It is clear that once code, applications, Services and features are deployed into a live network, they move into an operational domain and must come under a logically separate system of control.

It is optional that it is the responsibility of the SDS Configuration Management system 297 to maintain version management control of Profiles such that customer data can be rolled back from SCE3 and Service Management systems. An alternative is that a Service Management system provides this capability.

4.5 IN Element Domain 200

4.5.1 Service Delivery Infrastructure 300

The Service Creation architecture described here has been designed under the constraint that IN Elements 102 have internal implementations that support rapid service creation and deployment activities, i.e. that something that offers the right capabilities for dynamic feature deployment, platform independence and the resolution of feature interactions exists on the IN Elements 102. The Service Delivery Infrastructure (SDI) 300 is a design for an implementation that meets these and more detailed requirements for Rapid Service Creation. As such it is mentioned here for information, not as an architecturally dependent entity. Network entities such as particular Intelligent Peripherals may not host SDI, but still must support Service Creation activities within the context of this architecture.

An SDI 300 has been designed to encapsulate and abstract the network and vendor-specific interactions of service applications 271. It provides an object-oriented framework into which service applications 271 and features may be deployed. Interfaces such as Service Management, Network Management, Billing, Fault Management and Call Models are encapsulated within objects, separating the applications from whatever transmission and management systems which may exist to support the service. The purpose of the SDI 300 is to establish clearly the separation between.

the underlying physical network, discrete service networks, services available to be configured into particular service networks, and features and generic capabilities available to build a particular service.

The main purpose of separating services from infrastructure is to provide a dynamically extendible environment and allow feature-rich services to be introduced in very short time frames without impacting on other services or parts of the environment.

The SDI as described above is subject to co-pending International patent application numbers GB95/00420 and GB95/00421, also in the name of British Telecommunications plc, and the disclosure of those patent applications is incorporated herein by reference, as an example of a service delivery infrastructure which might be used.

FIG. 3 represents a relationship between a form of SDI 300 and other platform components on a typical IN Element 102. Interfaces to external systems, traditionally operated by function calls on the SLEE applications programming interface (API), are encapsulated in object representations 301–305 of those systems. The Virtual Switch 303 encapsulates the call models for one or more vendor's switches (SSPs) 230.

Services are delivered in the context of Service Networks 306 of which there will usually be one per customer. Each Service Network 306 has a Service Directory 307 for discriminating between services and a Number Directory 308 which represents the customer's dialling plan of virtual network numbers. Each Service Network 306 is capable of supporting a range of Services constructed from Service Application Features 401 and Generic Service Components 402. New features and profiles are introduced dynamically from SDS 100.

4.5.2 Voice Response Applications 299

It is anticipated that many announcement, dialogue and messaging services will be provided by specialised platforms. These platforms will interact with main call control processors as intelligent peripherals. Applications 299 within SDI 300 will be able to use the facilities these IPs offer to provide complex speech-based services. The applications that provide these facilities will be developed to service the requests from SDI 300. These applications will be designed to allow Service Creation and provisioning at all the previously described levels. It is not necessary that these Voice Response Applications 299 will be responsible for any call control functions.

5. SERVICE CREATION DATA ARCHITECTURE

Referring to FIG. 4, the data architecture underlying the Service Creation Architecture reflects the three SCE domains 265. It provides a hierarchy of objects that are used to encapsulate increasingly complex information and logic as service development progresses towards deployment.

The lowest layer 400 is that of Service Application Features 401 and Generic Service Components 402. These are code objects that are developed to meet service requirements and use general service capabilities. These are developed at SCE1. Once deployed, these objects can be referred to by Marketable Service Features 403 or Metafeatures 406 created at SCE2.

MSFs 403 encapsulate both the call-handling logic of a feature and the necessary support and management descriptions 407 of that feature, such that it can sold as part of a Service. In particular for the purposes of the present invention, MSFs 403 contain screen icon information 408 and form information 409 which the user will use at SCE3 to manipulate and provision MSFs 403. Metafeatures 406 are similar to MSFs 403 but exclude screen definitions 408 or aspects 409 provisionable at SCE2265c.

A Service Package 404, again constructed at SCE2, permits the collection of a set of MSFs 403 and/or Metafeatures 406 that will meet the overall requirements of a particular Service. In addition a Service Package 404 will contain any Service-specific support and management information 410. Finally, a Service Package 404 will contain at least one Service Template 405, which describes the operation of the Service and defines the constraints under which modification of Service operation can take place. All these objects are described in more detail below.

5.1 Service Application Feature (SAF) 401

The relationship between Service Application Features (SAFs) 401 and Generic Service Components (GSCs) 402 can be described as follows. A GSC 402 represents a generic capability to support a range of services. A SAF 401 is the general name for any capability that is deployed in the network as a feature. This means that, usually, a SAF will either be a GSC or be composed of GSCs. However some Services may require specialised capabilities that cannot be termed generic. Both SAFs and GSCs will be reusable, but not all SAFs will be generic.

A Service Application Feature (SAF) 401 is a reusable code object, deployed on an IN Element 102. From the service creator's point of view it represents the lowest level of granularity discernible outside Service Creation Level 1 (SCE1). These objects are designed, developed and tested at SCE1. These objects represent the fundamental components of a Service and are designed to be reusable across different services. For example a number translation feature such as Call Diversion will be reusable across Voice and Data Services [hence it could be both GSC and SAF].

SAFs 401 are developed to be independent of specific Service Application implementations and have no intrinsic knowledge of any network architectures, specific platforms, Service Management, Network Management or Billing entities. As such a SAF 401 represents a feature that can be deployed on an IN Element 102 to provide call-handling capability, but has no value until instantiated with user state information associated with a particular Service. In the embodiment of the present invention being described herein, this will be within the context of a Service Network.

5.2 Marketable Service Feature (MSF) 403

Figure 5:
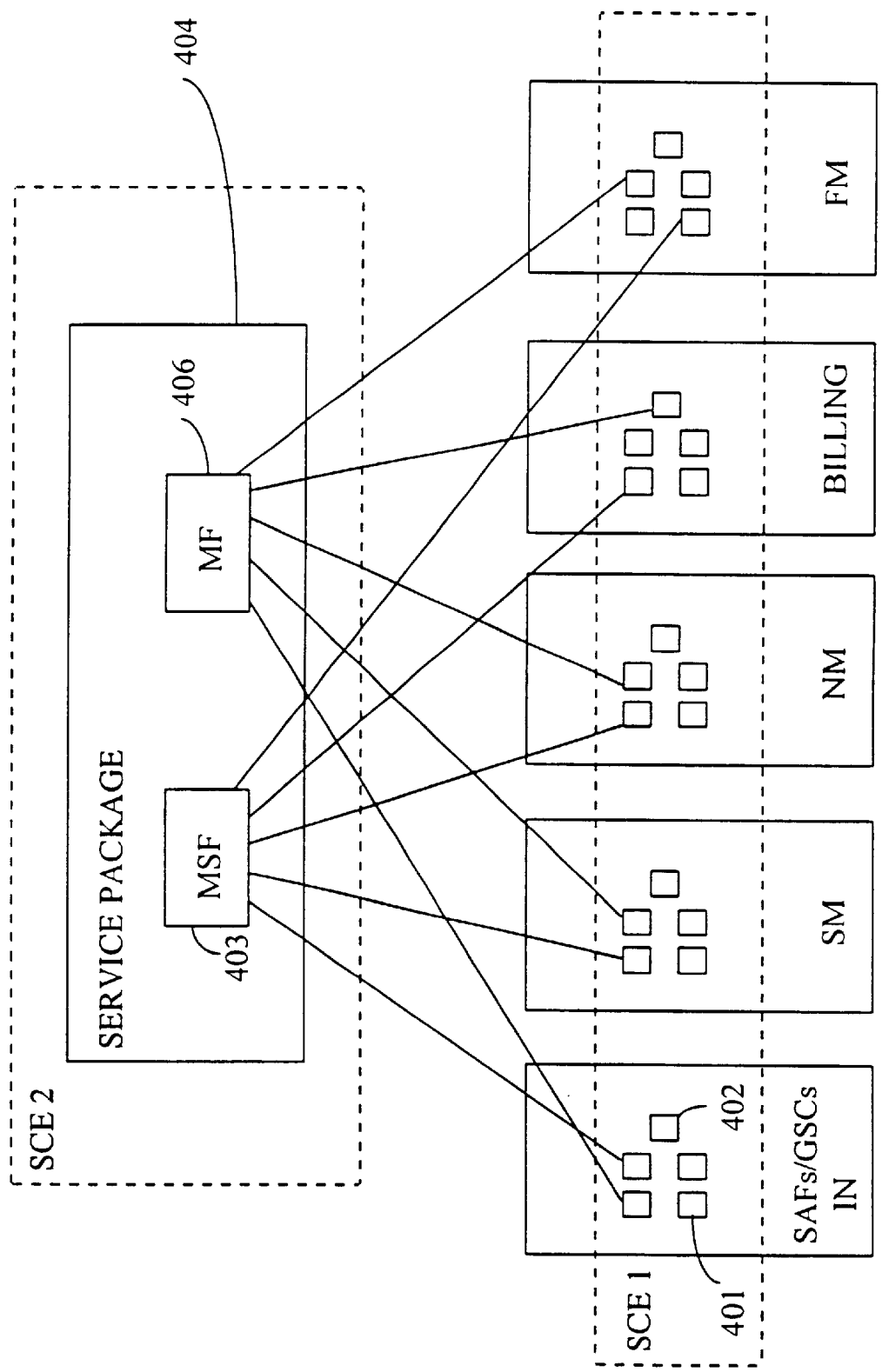
FIG. 5 shows schematically the construction of a type of object, a marketable service feature, from system-wide components.

Referring to FIGS. 4 and 5, a Marketable Service Feature (MSF) 403 represents a view down onto one or more underlying SAFs 401. MSFs do not contain SAFs, but only refer to them. MSFs are created within SCE2 to add value to SAFs 401 such that they can be sold as part of a Service Package (see 5.3 below). For a SAF to be marketable it must be associated with suitable Billing and Network Management references 407. Most importantly, the Service Management aspects of the feature must be addressed.

MSFs 403 therefore contain references to SAFs 401, together with the definitions 408, 409 of the screens necessary to input and update the provisionable aspects of the feature. These provisionable aspects will include the information necessary for the feature to run correctly. However, provisionable aspects of an MSF 403 may extend beyond those required by the underlying SAF 401 to which it refers. In particular there may be aspects of Network Management and Billing that are also provisionable for a particular feature.

Different MSFs 403 may refer to the same underlying SAF 401. For example a straightforward scheduled number translation feature can be sold as Time of Day, Day of Week, Day of Year or Special Day Routing, Night Service or Open Hours depending on the marketing requirements of the Service or customer needs. They may even be resold under different guises within the same Service. All these MSFs 403 have different provisioning and charging characteristics but the underlying network implementation will be common across them all.

The long-term aim of the MSF concept assumes that Billing, Service Management, Network Management, Fault Management, etc. components will be available as reusable building blocks (like SAFs/GSCs) on their target systems such that MSFs 403 and SPs 404 can be constructed from the SDS repository 100 for the majority of Services with the minimum of additional code developments. The construction of such building blocks implies that a certain amount of SCE1 activity takes place amongst the designers of such management systems to support SCE2. The consequence of this assumption is that service creators at SCE2 will have access to the complete capabilities of both the IN Elements and the supporting management systems to construct complete Services, for both large customers and individual users, for immediate deployment into generic Intelligent Networks.

5.2.1 Meta Feature (MF) 406

An MF 406 is substantially the same as an MSF 403 but has no provisionable aspects for the purposes of SCE2. Therefore an MF 406 again contains references to SAFs 401, for instance in the form of a SAF graph, but does not contain screen information 408, 409 for the SCE3 level.

MFs 406 are used to provide functionality such as initialisation of internal data structures, reservation of resources and user validation before a specific user has been determined. For instance, an MSF 403 might allow a user to input details of an account code and Personal Identification Number (PIN) but an MF would carry out the associated validation, something which is mandatory and which the user cannot modify.

5.3 Service Package (SP) 404

A Service Package (SP) 404 is the entity that is used, in SCE2 265b, to associate MSFs 403 and MFs 406 with a particular Service deemed marketable by the Service Provider. The SP 404 will therefore contain MSFs 403 and/or MFs 406, as well as Service-specific information 410 related for instance to Service & Network Management and Billing.

An example of a service package is included in Section 16 of the present specification, giving a description and an example of a text file version of a service package.

In practice, an SP 404 may contain an "IDENT" portion (name, identity, version), a "SCREEN DEFN REF" (a reference to a URL file which defines in data how the screen will look) and "RULES".

The rules, in more detail, will determine which MSFs 403 or MFs 406 will be needed at which stage in providing a service and can be expressed in a flow diagram type of format, called herein an "edit graph" (see Section 5.3.2 below), stringing together MSFs and/or MFs in predetermined order and combinations. Each MSF 403 then comprises icon information 408, to determine an associated icon which will appear on screen for use by the user at SCE3 level in manipulating the MSF 403, a screen definition reference 409, to control the form which appears on screen when a user selects an MSF box from a graph, and a list of SAFs 401.

The MFs 406 however exclude the icon information 408 and screen definition reference 409 for the SCE3 level and thus are never visible to a user at SCE3 level.

5.3.1 Service Template 405

The Service Package 404 will also reference one or more Service Templates 405, representing profile instances, upon which SCE3 customers can base their user profiles. The Service Template 405 represents a tested expression of the service operation that the service provider guarantees to work when fully provisioned but in a form general to all users. That is, a Service Template 405 will have a default service state set. It comprises an execute graph (see Section 6.2 below) with the default service state set. Therefore, if a service is to be provided in which any user can potentially get a number of retries in the range 1 to 9, the default service state might be 3. A particular user can then use the Service Template 405 to create a user profile by modifying the default service state to set the number of retries at 5.

The SP 404 encapsulates the rules mentioned above, provided from SCE2, such that subsequent attempts to edit or modify the service operation and logic are constrained within operationally acceptable bounds. In this way the configuration of the SCE3 Profiling Tool is controlled by the Service Provider such that underlying feature interaction and dependency rules cannot be violated by customers when tailoring their profile for particular groups of users. The Service Template 405 provides the mechanisms for partial provisioning at the Service or customer level, allowing specific tailoring to take place before delivery.

5.3.2 Edit Graphs

Figure 24A:
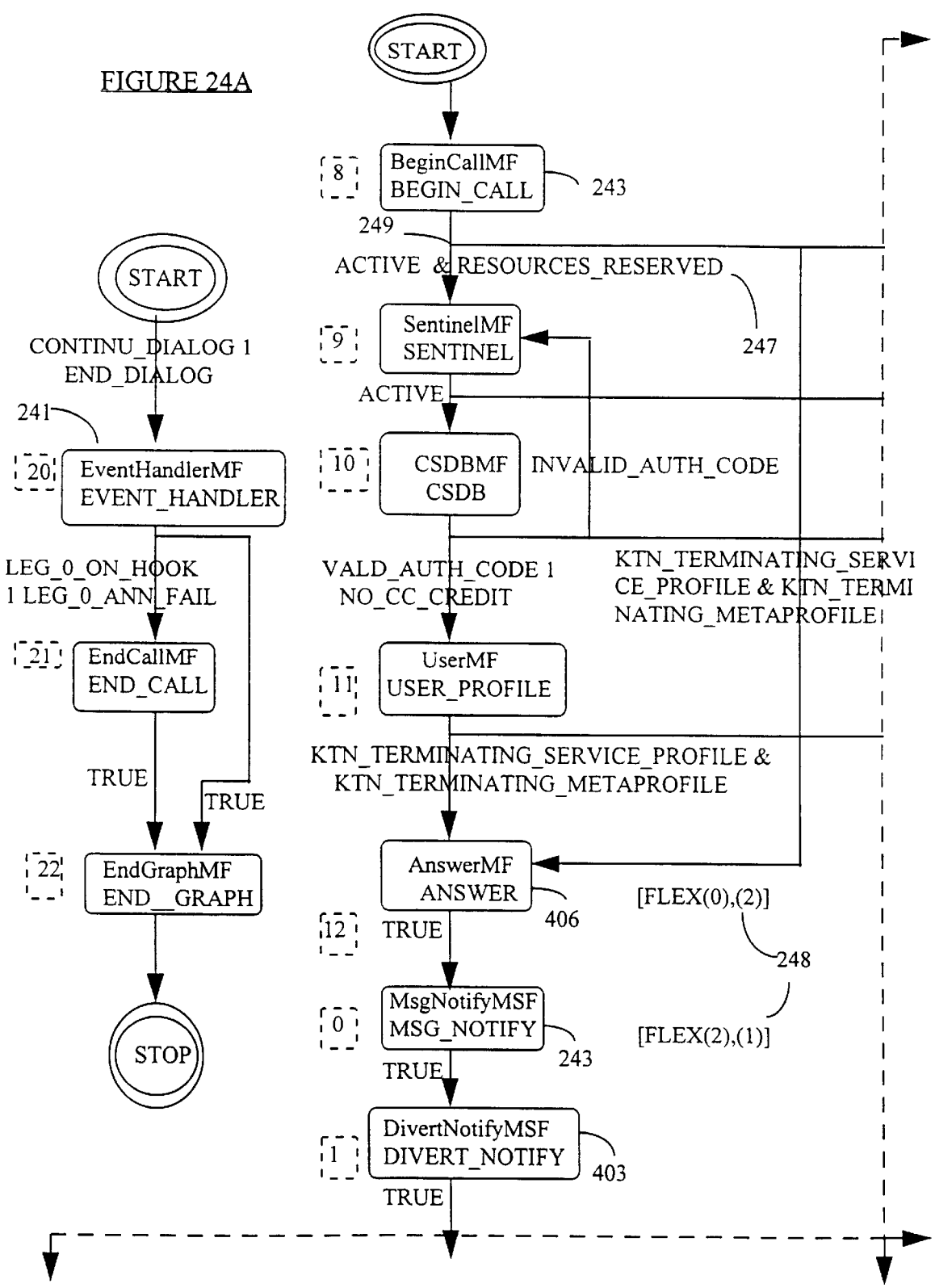
FIG. 24 shows an example edit graph, for use in customising a particular service.
Figure 24C:
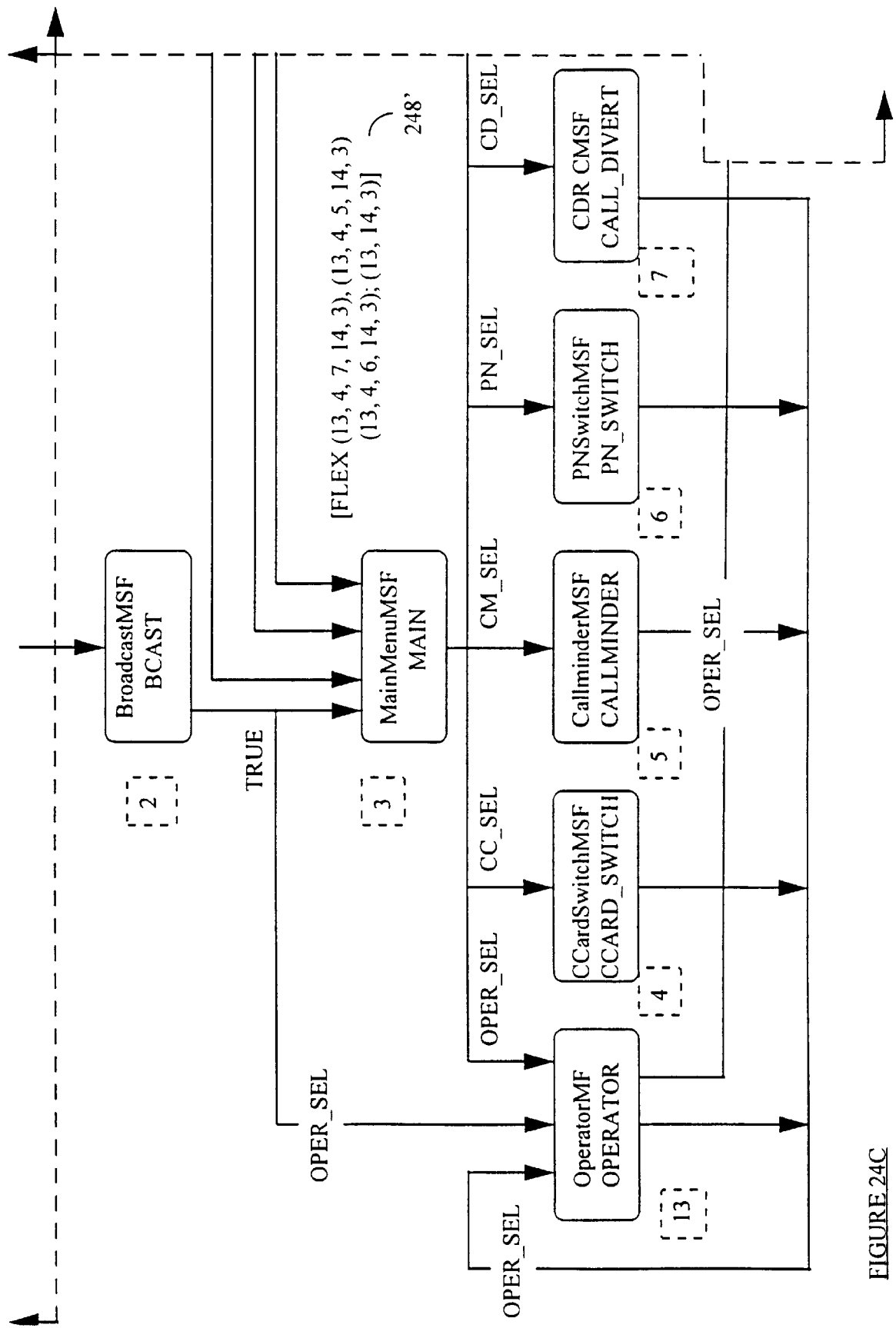
Figure 24D:
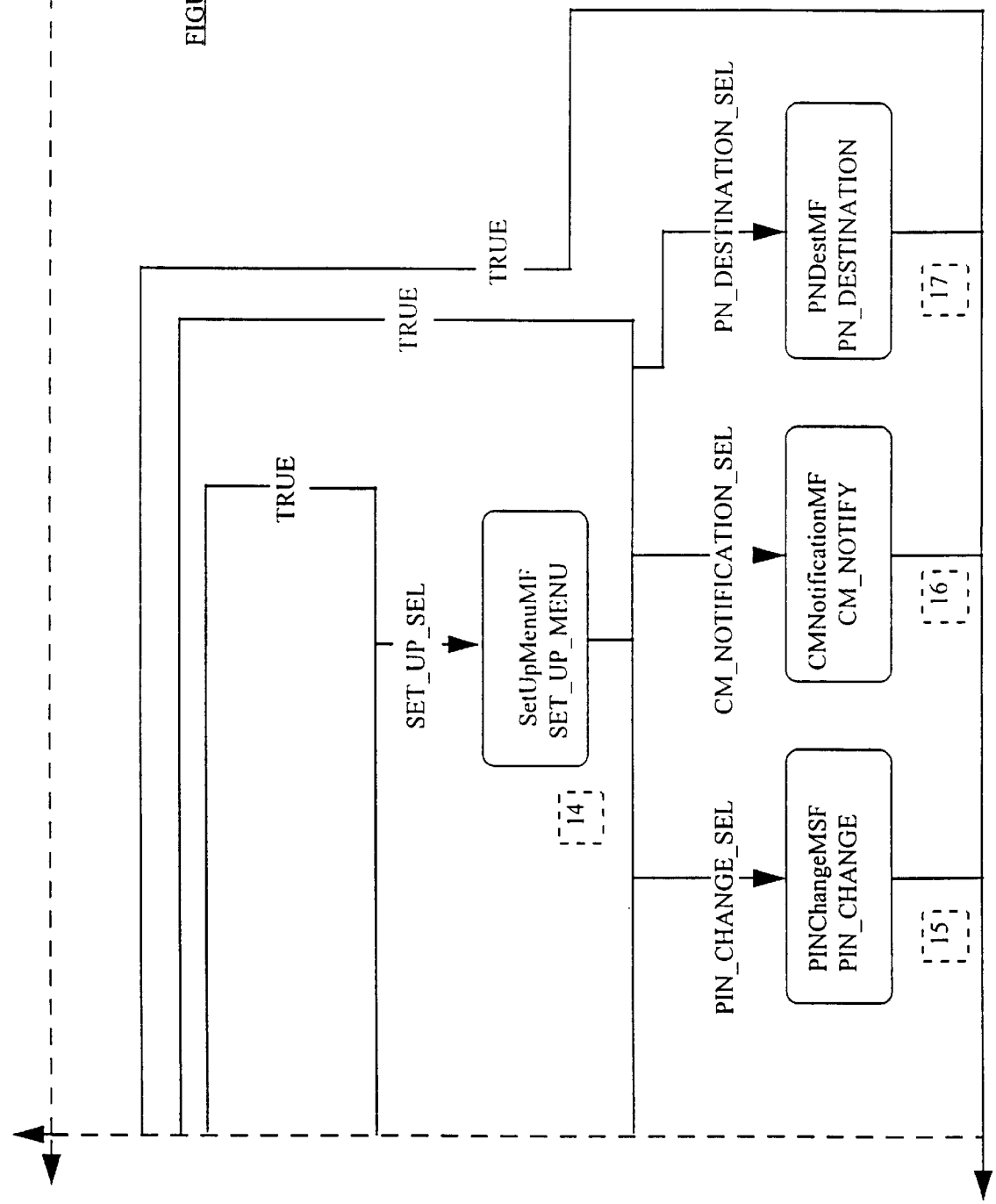

FIG. 24 shows an edit graph. These embody the Rules in SPs 404 which prevent unwanted feature interaction by limiting the service design capabilities at SCE3 265*c*. They are contained by the Service Package 404, as references to URL files, and are transported to SCE3 265*c* together with URL files where a user uses an edit graph for a service to create an execute graph. (It might be noted that XVT has been chosen as the tool here because it generates URL files which are UNIX compatible and therefore relatively platform independent, but another type of tool could of course be substituted.)

To make up a Service Profile, which provides the link between the description of a service in a Service Package and what needs to go to the Service Delivery Infrastructure 300, the SCE3 user needs to generate an "IDENT" portion and associate a "DATA" portion. The "IDENT" portion contains execute graphs for different aspects of running a service, such as "originating", "form", and "terminating" execute graphs. The "DATA" portion references the relevant SAFs. (Forms have indicate objects with fields which take a string of attributes for a real profile.) The execute graphs can provide customisation but only within the constraints applied by the associated edit graphs received from SCE2.

Figure 26:
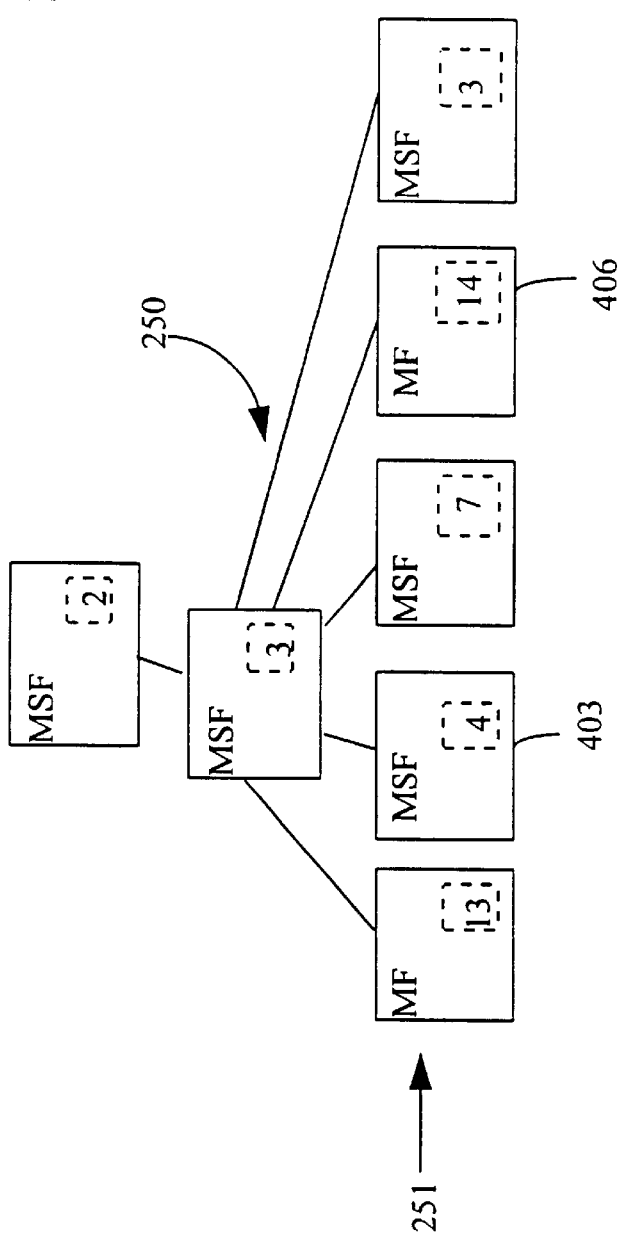
FIG. 26 shows a decision point arising in an execute graph as a result of a flexibility point 248' in the edit graph of FIG. 24.

Referring to FIGS. 24, 25 and 26, an edit graph as shown in FIG. 24 comprises an ordered series of MSFs 403 and MFs 406, connected by links 249, some of which MSFs 403 and MFs 406 are associated with flexibility points 248. The flexibility points provide a mechanism in a user interface to indicate multiple choices available to a user. At each flexibility point 248, there is a choice of MSFs and MFs which might follow. Each MSF 403 and MF 406 has an associated reference numeral (shown in square brackets on FIG. 24). The choice of MSFs and MFs at a flexibility point 248 is shown by a list of these reference numerals.

Working from an edit graph to create an execute graph, the user can customise by selecting one of the choices. FIGS. 25*a* and 25*a* show two different execute graphs which could be constructed from one edit graph by making different choices at a flexibility point 248'. Each choice may also however comprise a set of alternatives which are then executed (to run an actual service) according to a further convention. In the present embodiment, as seen in FIG. 24 at flexibility point 248', as an example a user at SCE3 can select that the resultant execute graph will go to a selected one of four alternative sets of MSFs or MFs. The decision made by the user from the edit graph will select one of those sets.

The execute graph, once constructed by the user or customer, will be associated with user "state" data, a user profile (further discussed below), and loaded to wherever it is required by the service delivery system, such as to a service node or SCP 231. The execute graph when subsequently being executed for instance by a service engine, will then go always to the selected set 251 of MSFs or MFs at that point. Referring to FIGS. 25 and 26, in the further convention mentioned above, this creates a decision point 250 in the execute graph. At the decision point there is still a set of MSFs 403 and/or MFs 406 to be executed at a single point in the execute graph. The set 251 of MSFs andior MFs are then taken in turn, in a predetermined order, such as from left to right in the execute graph according to the convention, and each tested for a correct view. When a correct view is found, for instance for the first of the set as shown in FIG. 26, that MSF or MF is executed. (A correct view is a view which is true. It could be a data element, ie a "scene", or a logical expression. For instance, SAFs 401 will have input and output scenes.)

Because the execute graph comprises MFs as well as MSFs, and these have no associated visible screen at SCE2, it is possible for a user at SCE3 apparently to create a service from a blank screen. However, in practice the user has always to work from an edit graph. Even an edit graph presenting a blank screen will in fact contain MFs and such an edit graph will still apply constraints as the user produces an execute graph.

Since there is no point in providing a blank screen for provisioning at SCE3 265*c*, the service provider may require in practice that the user selects at least a service type in which case there may be a limited number of MSFs 403 involved, which will appear on the screen, or the screen may provide a palette of MSF icons which the user can pull in to create an execute graph.

In FIG. 24, there is shown a short additional graph including an "Event Handier" MF 241. This graph is actually part of the main edit graph—it is an "invisible" (to the SCE3 user) edit graph and is called by an event handler. Basically, if one of the other nodes is being processed when, say, a caller puts down their handset, the event handler will call this routine to clear down the call. It allows different call treatments to be applied to different events and there are therefore two paths to the stop node.

(It will be recognised that metafeatures will need screen information associated with them for use by the SCE2 265*b* user in creating valid edit graphs. This screen information is not however available at SCE3 265*c*.)

5.4 Profile 600

Figure 6:
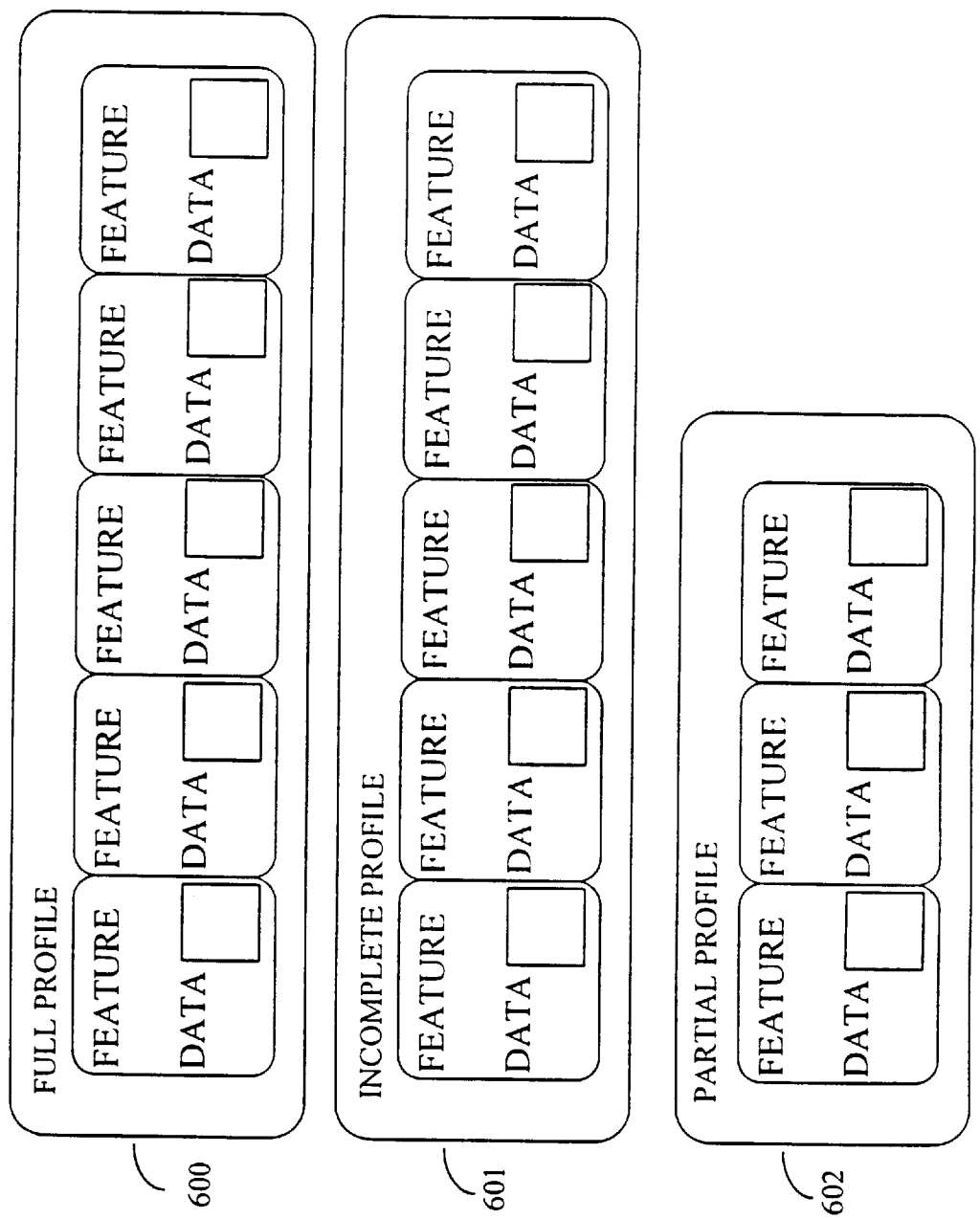
FIG. 6 shows different profile types, a profile being a user-related list of features that a user has for a particular service.

Referring to FIG. 6, a Profile is derived from a Service Template 405. The Service Template may have been modified and partially or wholly provisioned by the SCE3 user. However, a Service Template does not become a Profile until a particular instance has been associated with a specific user of the Service. A Profile will contain a list of one or more features that the user has for a particular Service, and each feature needs to be provisioned with sufficient data for the feature to operate successfully within the context of that particular Service.

A distinction must be made between incomplete and partial Profiles 601, 602. An incomplete Profile 601 is one that may contain references to features that are not fully or correctly provisioned. A correctly provisioned feature should be defined as a feature that is either disabled or contains all the data that is required for it to operate successfully. It is a requirement that such profiles do not emerge from SCE3 265c until they have been checked and validated to contain all the necessary provisioning data. SCE3 allows the local storage of incomplete Profiles 601 while they are under construction. Partial Profiles 602 are those that do not contain all the features that are necessary to describe the full Service, but all the features a Partial Profile does contain are correctly provisioned. Partial Profiles will be valid and passed between Service Management 103, SCE3 265c, SDS 100 and IN Elements 102 as Profile update information.

6. EXAMPLE WORKSTRINGS

FIGS. 7 to 18 are virtually self-explanatory. They should be read in pairs, the first of each pair showing an example workstring and the second of each pair showing the associated architectural activity. The purpose of these workstrings is to exercise some scenarios to demonstrate the architectural design. By doing so it is shown that the architecture will support these common activities and thereby meet the requirements put on Service Creators to deploy and provision/tailor services in a generic Intelligent Network. Each workstring is presented in the form of a Message Sequence Diagram and an Overview Diagram (derived from FIG. 2) highlighting the active components and interfaces during the particular scenario.

FIGS. 7 and 8 relate to the deployment of new SAFs/GSCs 401, 402 from SCE1 265a.

Figure 9:
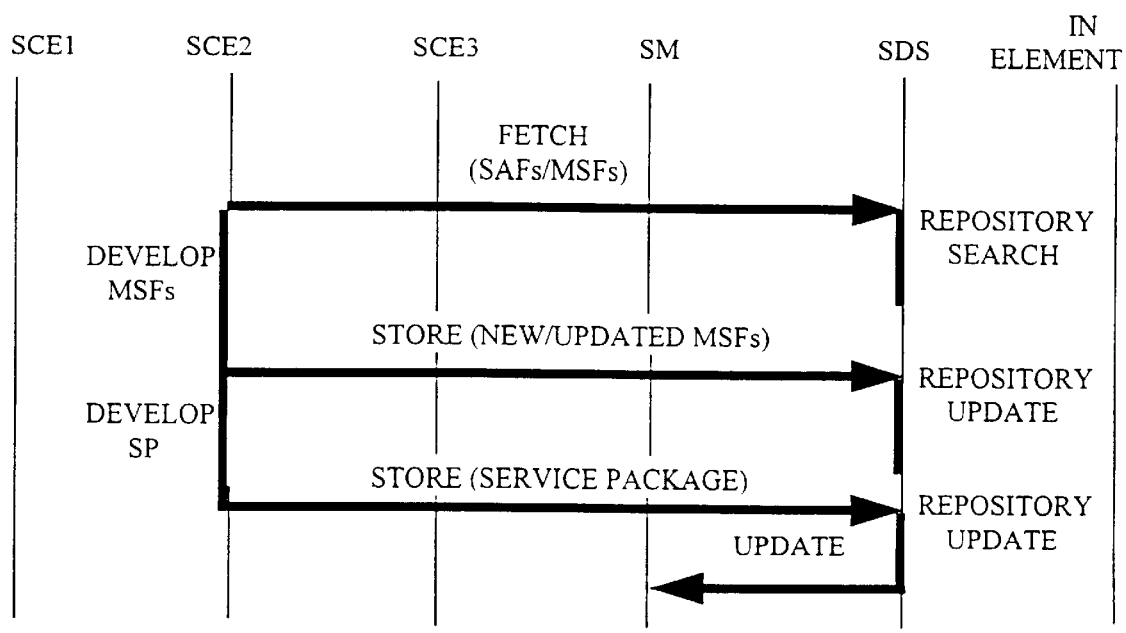
Figure 10:
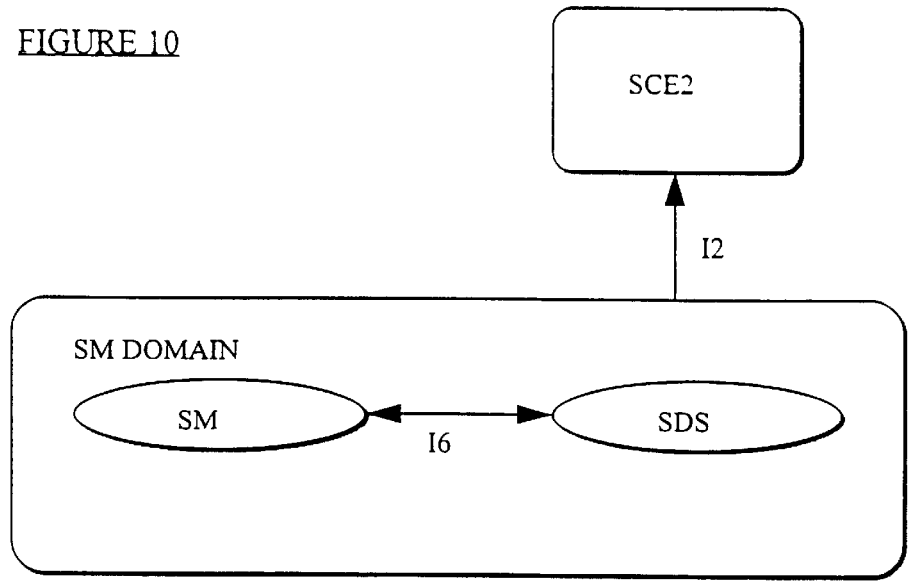
Figure 19:
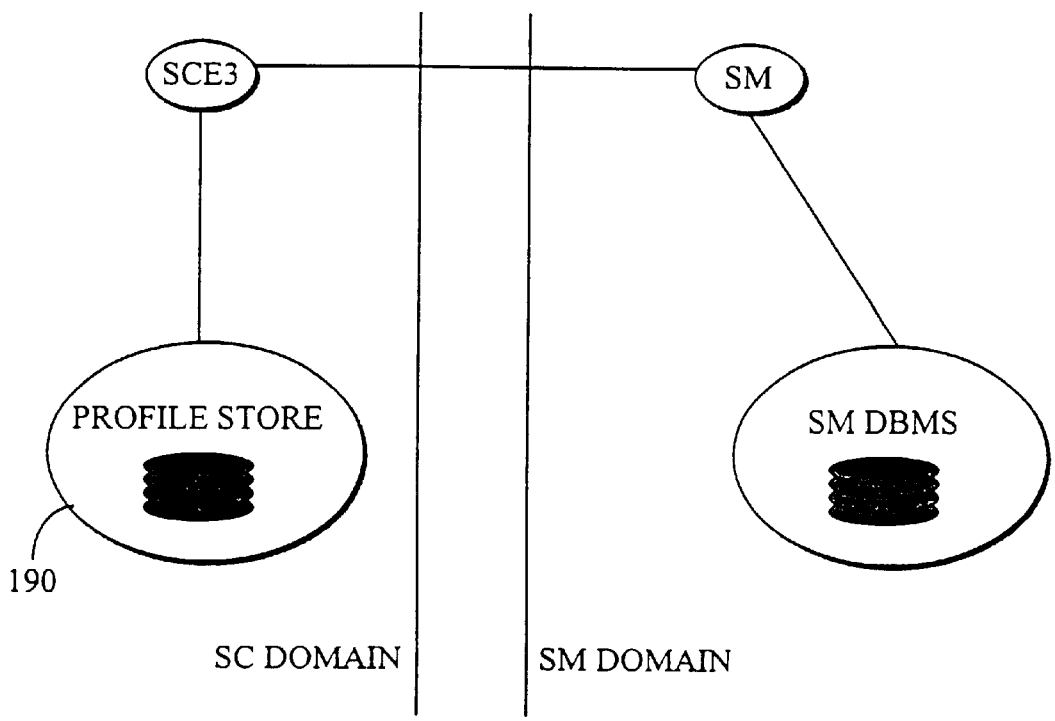
FIGS. 19 to 22 show specific data distribution scenarios which the service creation architecture of FIG. 1 will support.

FIGS. 9 and 19 relate to deployment of a new service.

Figure 11:
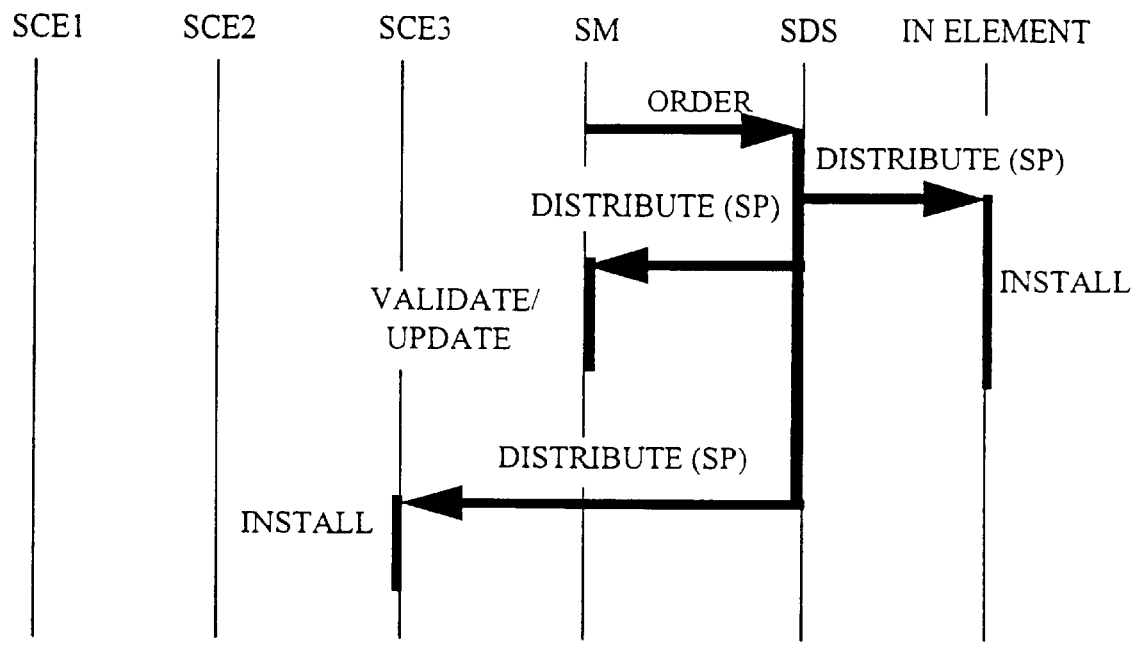
Figure 12:
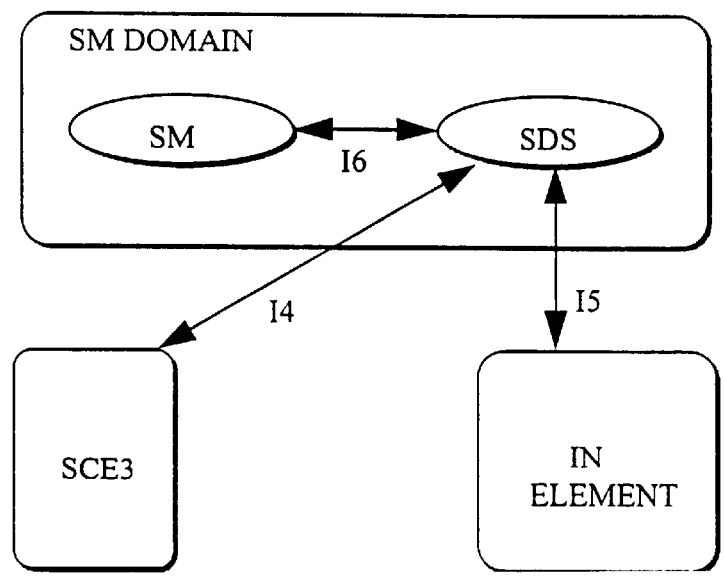

FIGS. 11 and 12 relate to ordering a new service.

Figure 13:
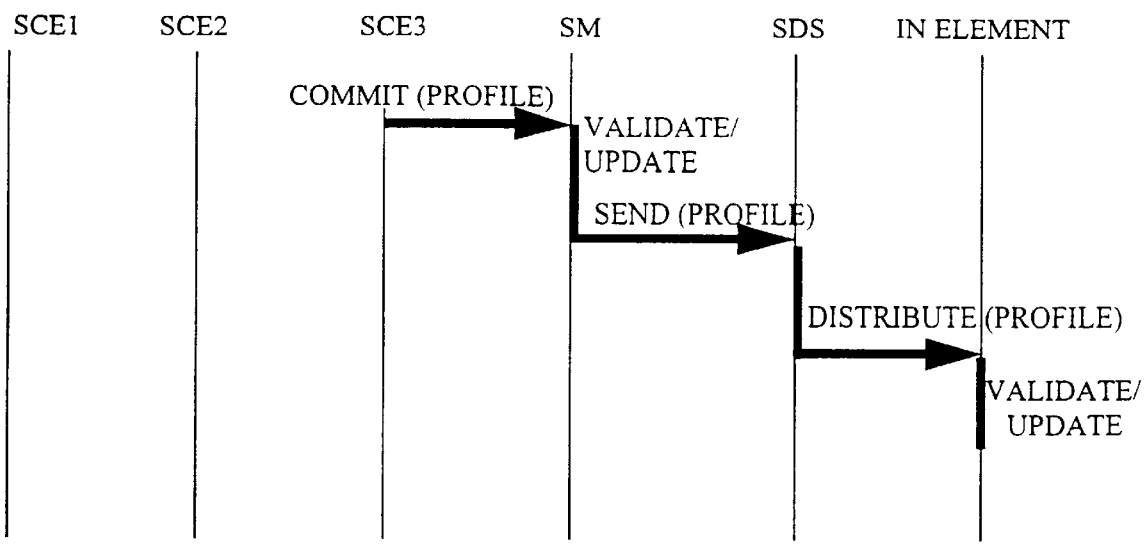
Figure 14:
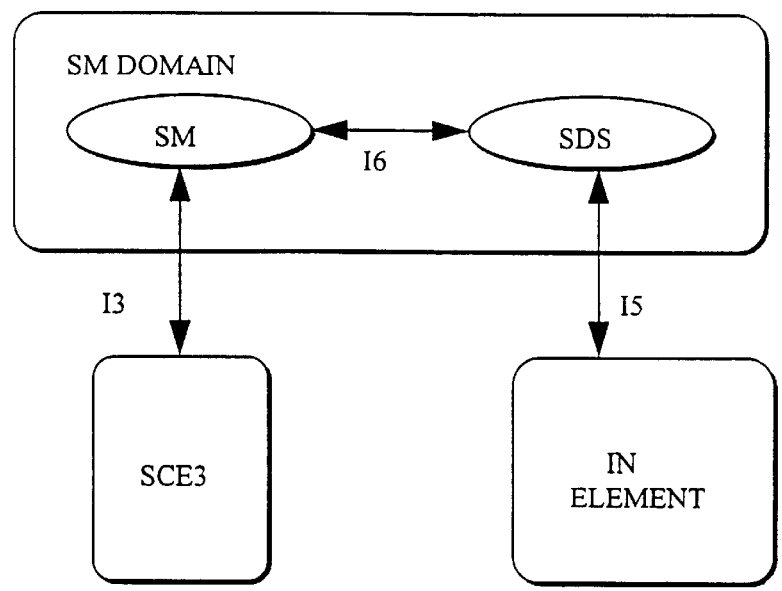

FIGS. 13 and 14 relate to updating a profile from SCE3 265c.

Figure 15:
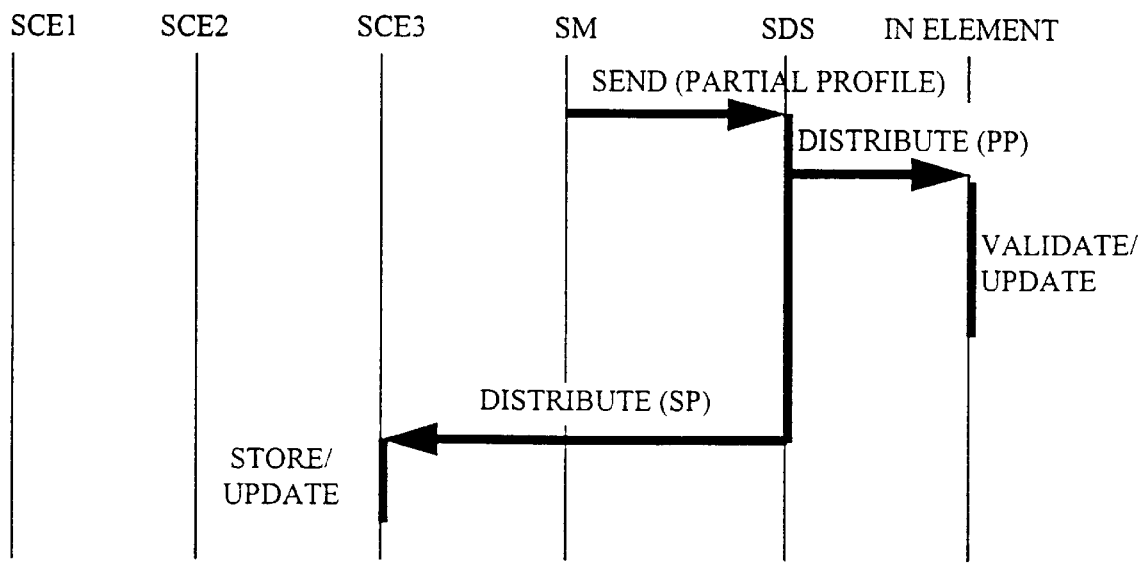
Figure 16:
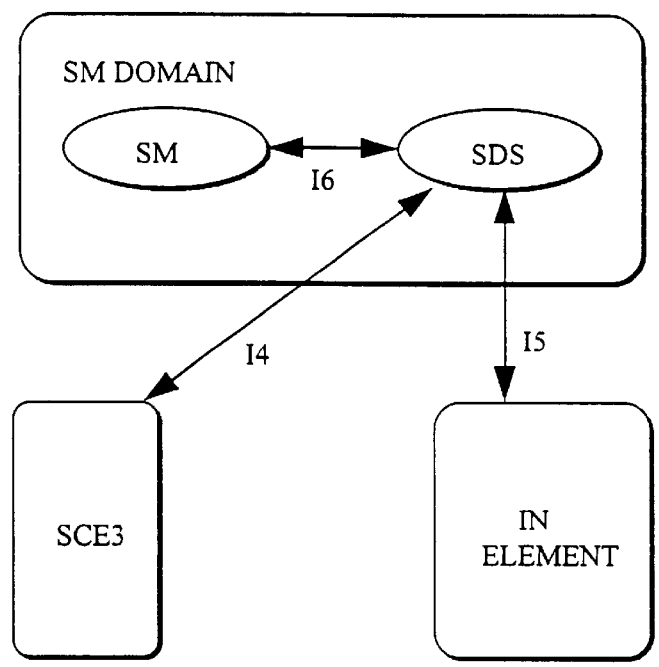

FIGS. 15 and 16 relate to profile updating from the Service Management Domain 270.

Figure 17:
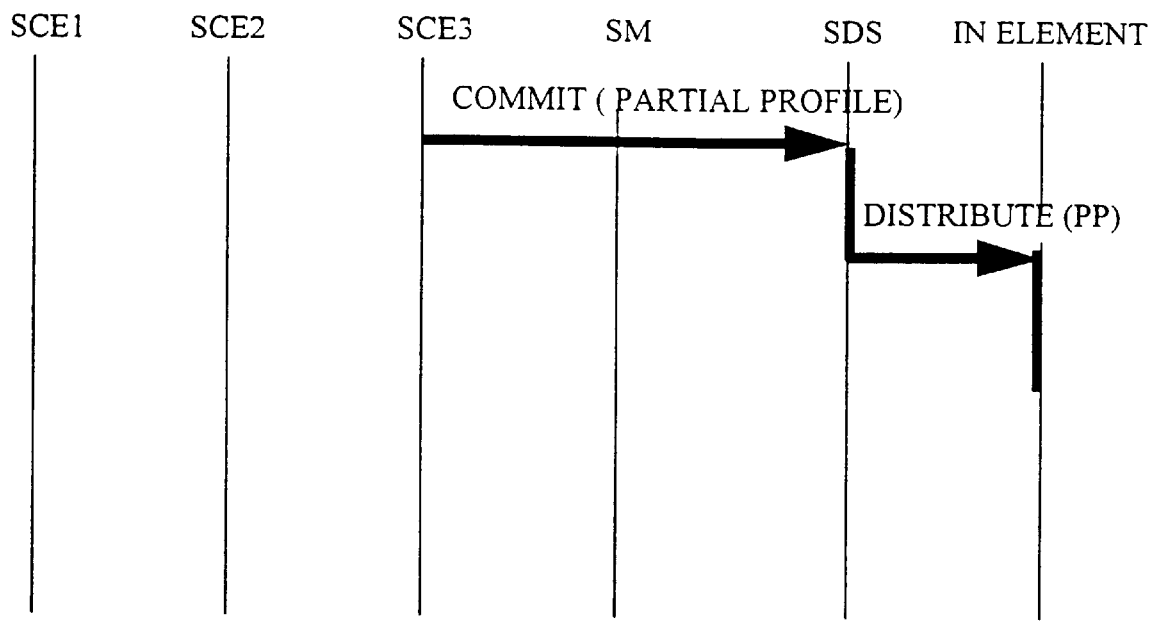
Figure 18:
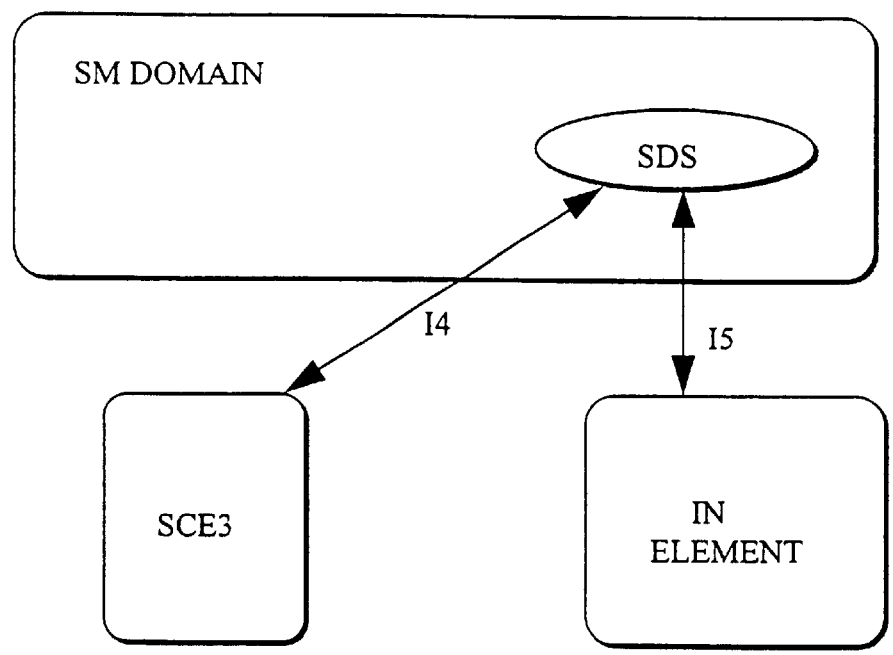

FIGS. 17 and 18 relate to Network-side Update via SCE3 265c.

7. DATA DISTRIBUTION—IMPLEMENTATION SCENERIOS

The following refers to FIGS. 19 to 22 and sets out example data distributions for use in a service creation system as described above.

It is important to sort out the location of master data, who owns Profiles (SM or Customer) and the enforcement of Service Level Agreements (SLAs) (usually viewed as within the scope of SM). The strategy of data distribution presented here presents a data storage architecture that can be flexibly configured according to performance constraints, Service Management requirements, network operator policies and customer requirements.

In a first example, SCE3 265c will not be directly coupled into a specific persistent store or database product. This capability will be abstracted via a defined interface permitting retrieve, store and send operations on the store, treating it as an external system module. The architecture maintains its vendor independence by encapsulating operations on the Profile Store so that the application can be chosen or upgraded according to needs and justification. This system permits the configuration of different profile storage scenarios according to SM policies and processing capabilities. The Service Creation Architecture will support all in a range of combinations, should the requirements exist. Scenarios enabled by this architecture are shown in FIGS. 19–22.

7.1 Scenario 1

Referring to FIG. 19, the Profile Store 190 resides within the Service Creation Domain. Store and retrieve operations happen locally and send operations allow provisioned profiles to be transmitted to SM.

IMPLICATIONS

Customers own, manage and are responsible for their own profile data until committed to SM.

Profiles are reconstructed from SDS data which maintains mastery over all network service data.

SCE3 customers must be provided with applications and support for profile data management.

7.2 Scenario 2

Figure 20:
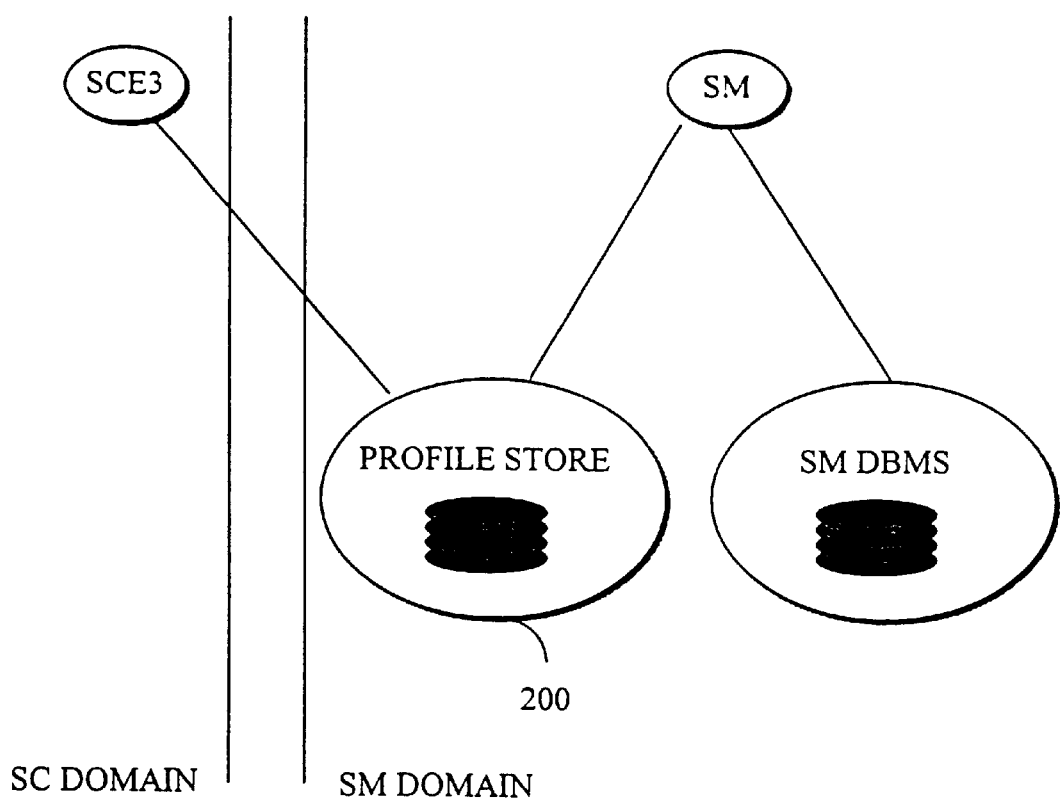

Referring to FIG. 20, all data is mastered on the SM. Profiles are passed from SCE3 to a Profile store 200 on the SM system. On retrieval, Service Management data is converted back into an updated Profile in the Profile Store 200 and then returned to the query process in SCE3.

IMPLICATION

SM is master and host of all data, including user profiles.

7.3 Scenario 3

Figure 21:
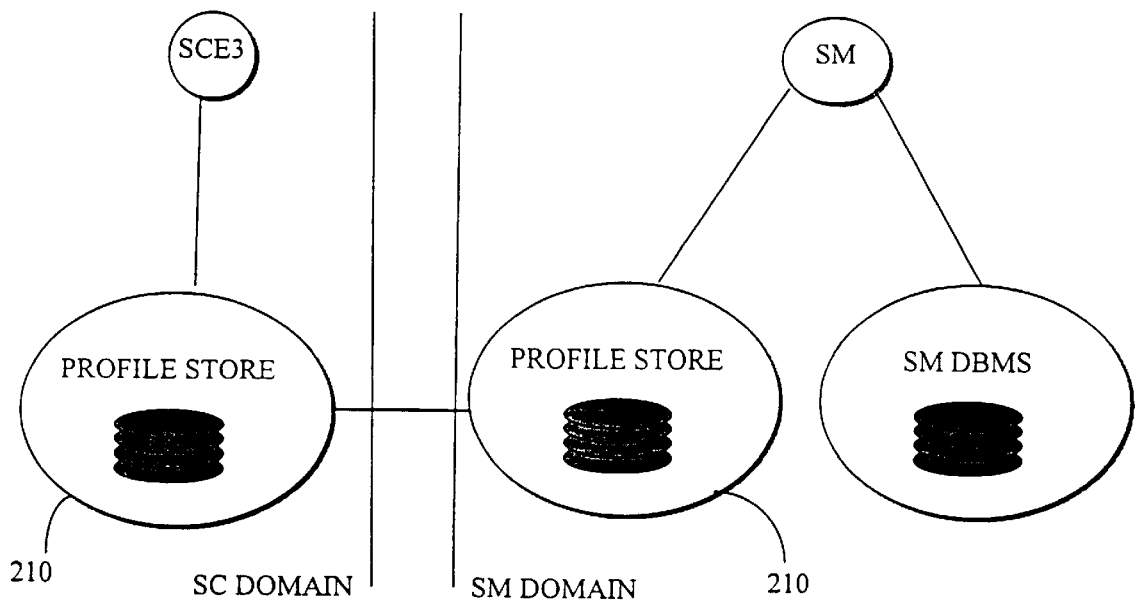

Referring to FIG. 21, a Distributed Profile Store 210 allows Scenarios 1 and 2 to be configured according to performance, policy and requirements on a per customer basis.

IMPLICATIONS

The data interface between two domains will be managed by whatever proprietary mechanisms exist within the chosen store implementation.

Chosen storage application must support distributed configuration.

7.4 Scenario 4

Figure 22:
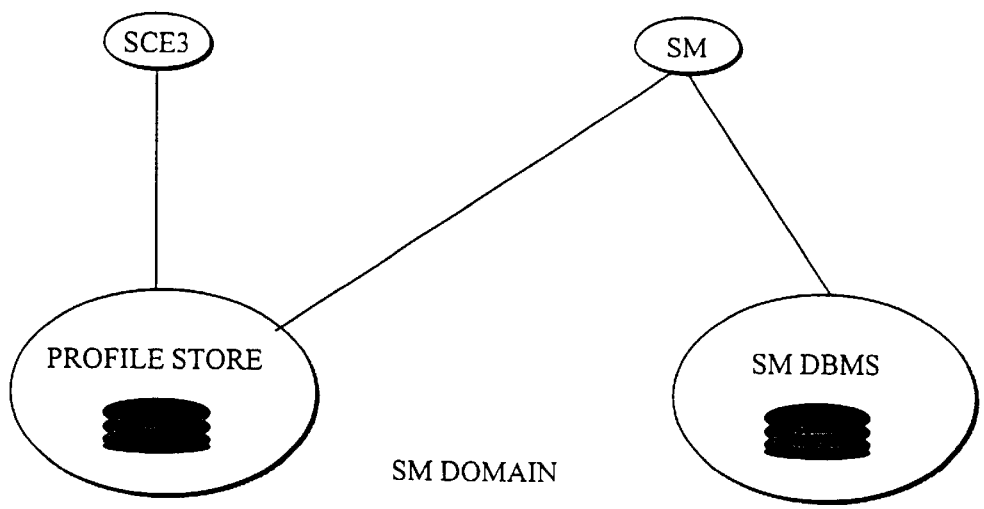
Figure 23:
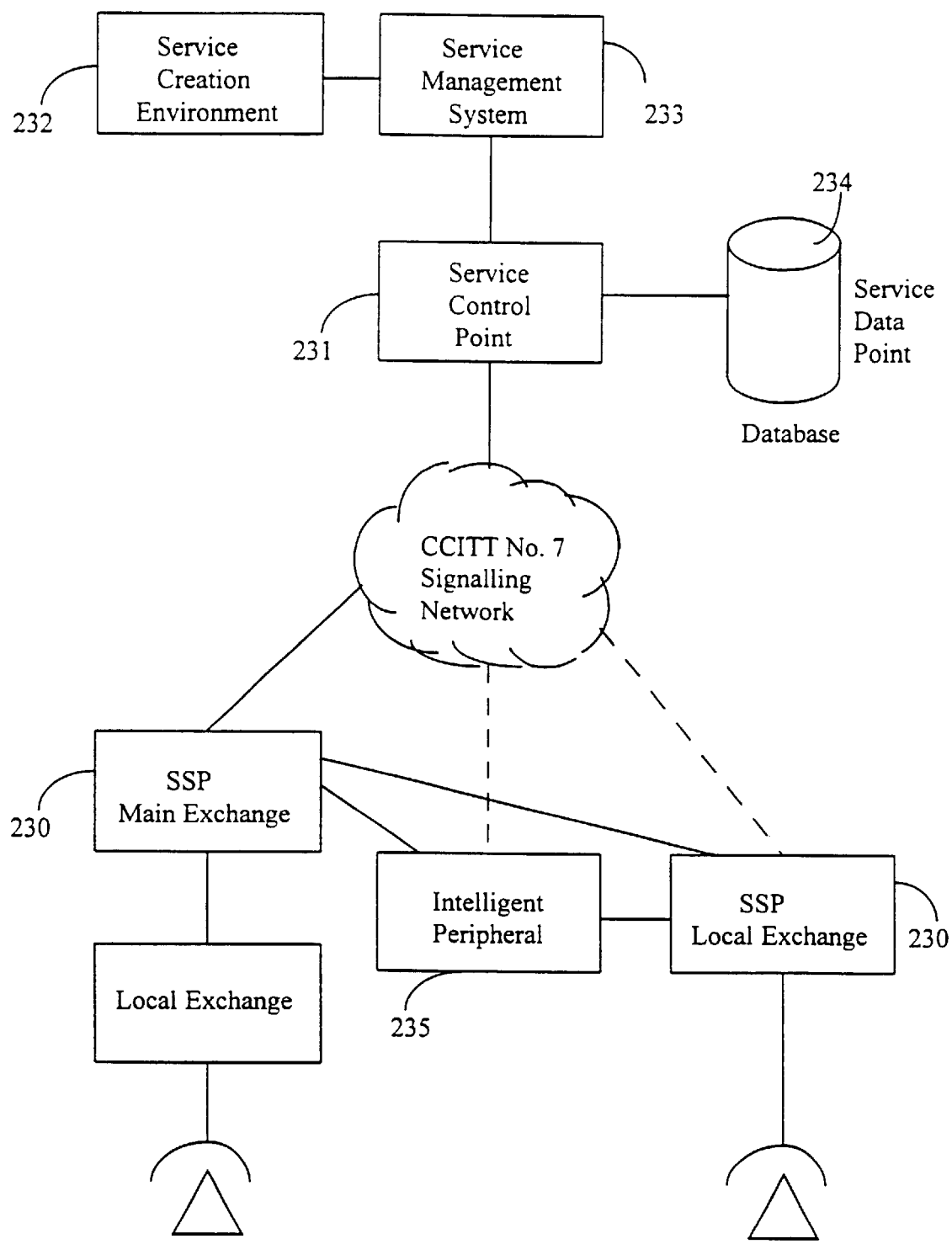
FIG. 23 shows a schematic diagram of a known type of IN architecture.

Referring to FIG. 22, SCE3 is co-resident in the SM domain. This provides for the use of SCE3 by the network operator's people on the Service Management system, providing customer support directly into their Service Packages and User Profiles.

IMPLICATIONS

Both customers and the network operator's support people will provision and update Profiles via the same toolset and provisioning screens, Certain customers may require remote access to the SCE3 toolset via some form of graphical workstation or client application (e.g. exceed), Service Management platforms must support SCE3 applications.

8. KEY TO THE NETWORK (KTN) SERVICE

The following shows a service which might be made available and customised by means of an embodiment of the present invention.

The KTN service is a service providing network access to a range of services by a single short code access number with single authentication and authorisation procedure. The user has one account number and one personal identification number (PIN) which is used to identify them to the KTN service. Once authorised, the user can select a service by for instance an interactive voice or "Dual Tone Multi Frequency" (DTMF) menu. The KTN service then retrieves, from data held locally within the KTN service and by voice/DTMF interaction with the caller, the information required to access the selected service. The information retrieved will include any subsequent authorisation codes and PINs required to access the selected service.

KTN accesses the selected service on behalf of the user and this may require dial up access to the service and emulation of the user so that the service is unaware that the access is via KTN and not the user. Once KTN has obtained service access, it may update, be updated by the service, or may hand the caller over to control of the service. Once interaction with the service is complete, control is returned to KTN and the caller is given the opportunity to select another service. If no other service is required, the user will hang up and end the KTN session.

The KTN service exists as an IN service which may be executed within a virtual network residing in the Services Delivery Architecture. Within the Service Creation environment 265, the service is presented as a Service Package 404. The following sections present a service-specific solution model using the Service Package semantics.

8.1 KTN Service Construction

The KTN service is constructed at SCE2 and deployed to SCE3 as a KTN Service Package. The KTN Service Package consists of a collection of Marketable Service Features (MSFs), Metafeatures, and associated configuration rules expressed as edit graphs. MSFs 403 and Metafeatures 406 are comprised of executable Service Application Features (SAFs) 400 and related provisionable data items.

The KTN Service Package is set out in Section 16. It contains a terminating edit graph. The edit graph contains execution order rules and provisioning rules for MSFs 403 and Metafeatures 406. The rules are specified by predecessor relationships, decision points, and flexibility points.

Flexibility points 248 convey subscription options for SCE3 provisioning. The flexibility points 248 provide the operator at SCE3 265c with optional MSFs 403, used to construct execution graphs. The Service Package 404 contains templates 405 that are un-provisioned execution graphs that have been constructed at SCE2 265b, according to the rules of the edit graphs. These template graphs may then be provisioned for a user at SCE3 and deployed to the network as the user's Service Profile. A Service Profile will contain a single terminating execute graph.

Predecessor relationships and decision points express the execution discrimination details for actual execution ordering during call processing in the network.

8.2 KTN Service Terminating Edit Graph

When the DTN Service is invoked, as a result of an incoming call to the KTN access number, the terminating execution graph, derived from the edit graph, is used for service execution. FIG. 24 provides a detailed illustration of the KTN Service Terminating Edit Graph. A derived execute graph (not shown in detail but of the type described above with reference to FIGS. 26 and 27, and shown in FIG. 25) then indicates the execution ordering of MSFs 403 and Metafeatures 406 and conveys triggering of successors, at decision points 250, in terms of Views 247, annotated on the links between graph nodes. (Successors that do not indicate a View are always triggered.)

When the execute graph is executed by a Service Engine, the first node in the graph is examined for MSFs 403 and MFs 406. If multiple MSFs 403 and/or MFs 406 exist at a graph node, this constitutes a decision point 250. The convention is that the view for the first subsequent MF or MSF shown to the left on the graph is executed. If the view 247 is found to be false, the view 247 of the next MF (or MSF) to the right is evaluated and so on, until a view 247 evaluates to true.

Flexibility points 248 within the edit graph are annoted as an expression at the node of flexibility. The form of the expression is:

Flex {a,b}, {c,d} where "a,b,c,d" are references identifying MSFs 403 or MFs 406.

Figure 27:
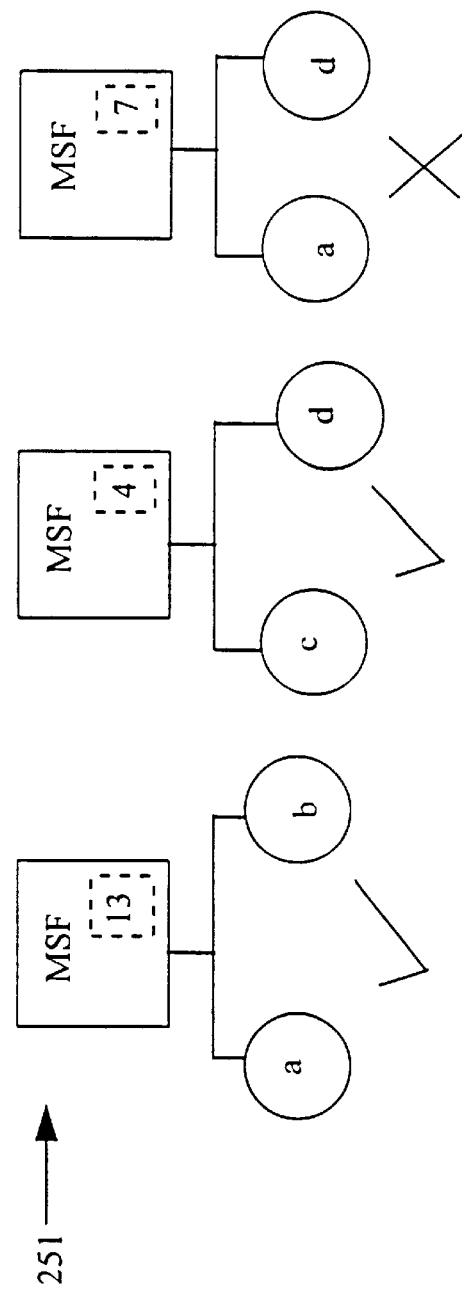
FIG. 27 shows correct and incorrect decision points for an execute graph, relevant to a flexibility point of an associated edit graph.

This indicates that the node where the flexibility is expressed in an edit graph, lets say node x, has the flexibility of selecting one of 2 decision points, as demonstrated by FIG. 27, for an execute graph. The execute graph which would be constructed from the flexibility point would then have one only of the two decision points.

(If the flexibility point shows a choice simply between two single MSFs instead of between sets of MSFs, for instance "Flex {a},{b}", of course the subsequent execute graph will not then show a consequent decision point.)

9. USE OF AN EMBODIMENT OF THE INVENTION BY A USER AT SCE3 265c

Figure 28:
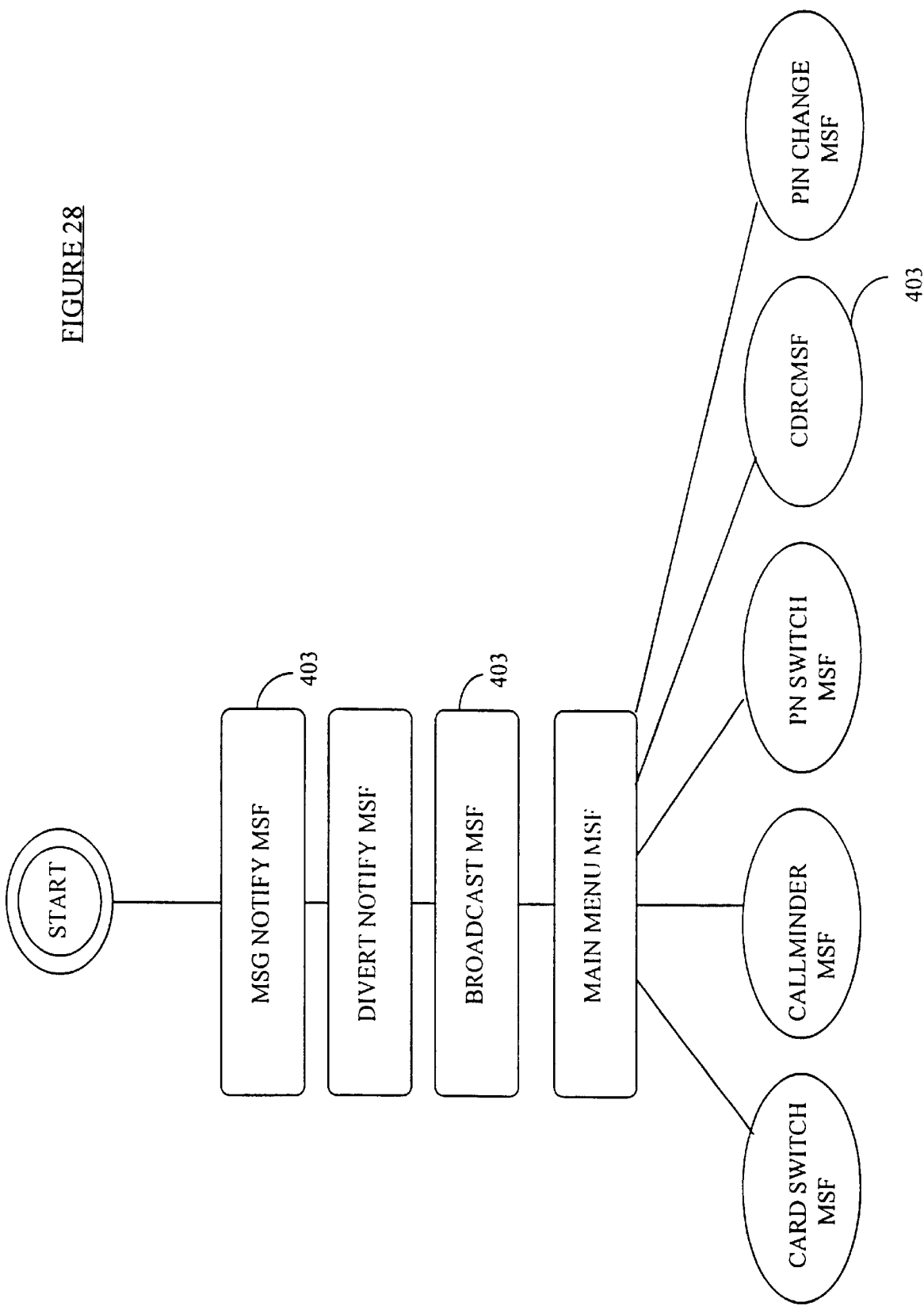
FIG. 28 shows a user's logical view of an edit graph.

Logically, what the user at SCE3 265c will see is the MSFs 403 only—the MFs 406 are invisible and as far as the SCE3 user is concerned, may as well not exist. Referring to FIG. 28, for the edit graph of FIG. 24, the user would see a relatively short set of MSFs 403.

Figure 29:
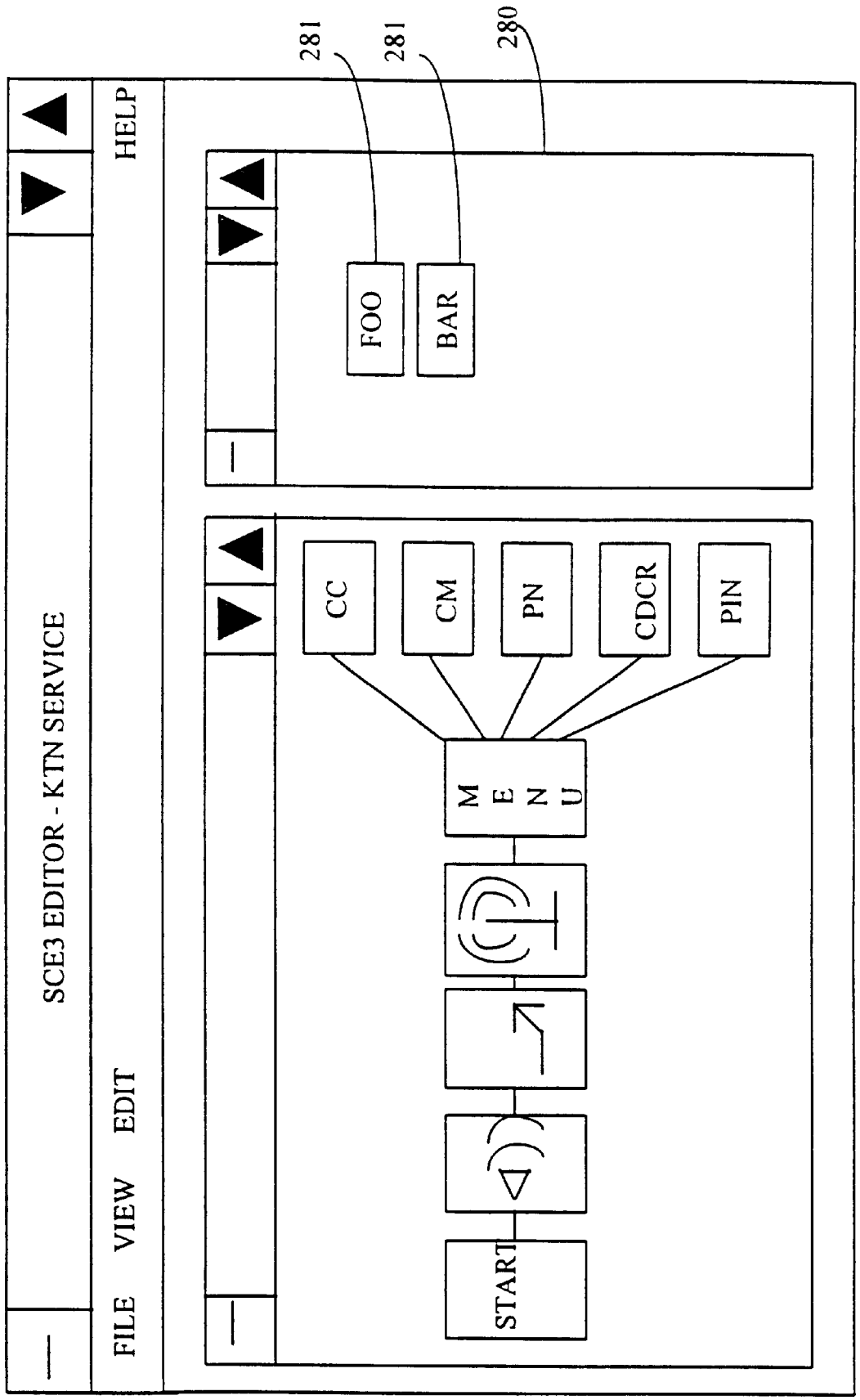
FIG. 29 shows a user's screen view associated with the logical view of FIG. 28.

Physically, the screen display might be more user friendly, as shown in FIG. 29. The window 280 to the right is a feature palette. It contains all the MSF icons 281 available for the user in the context of a "Key to the Network" service. The tool as a whole uses what is termed "constraint-based editing" which means that the user is constrained into only creating valid execute graphs—it is impossible for them to create an invalid graph as the tool does not give them the options. The key to this is the feature palette. If the user wishes to insert a particular node 281 (say, the one denoted as "Foo"), then the user would select that icon 281, using for instance a known type of mouse, and then select the option to insert icons from a menu. This could for instance be from the "edit" menu from the toolbar 282 shown in FIG. 29.

The tool then works out what the implications of adding the selected node 281 would be. It uses the full edit graph in the appropriate service package 404 to determine which nodes would need to be changed in the existing edit graph to allow the selected node 281 to be added. A window displaying the implications of the change would then be displayed and asks the user to confirm their action before carrying it out.

Figure 30:
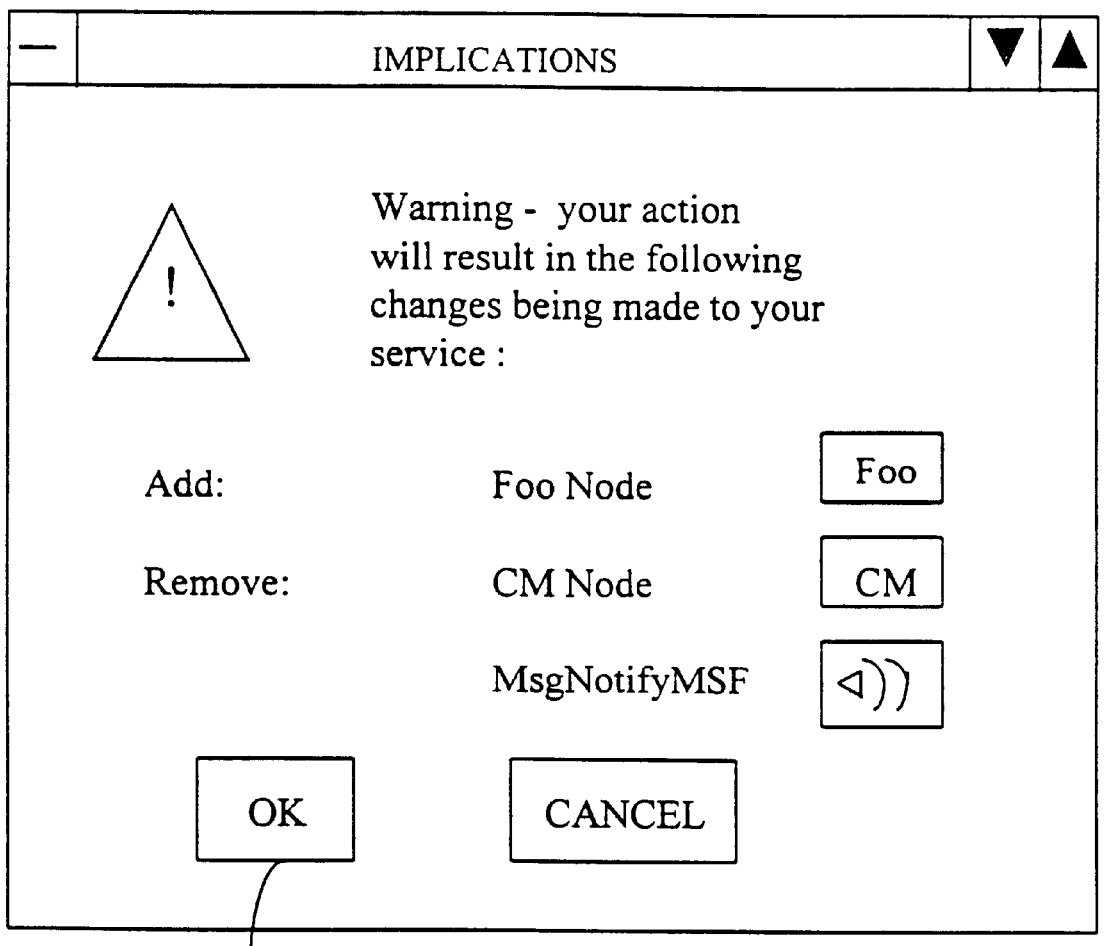
FIG. 30 shows an implications screen visible to a user during generation of an execute graph from an edit graph.

For example, referring to FIG. 30, say that the "Foo" and "CM" nodes were mutually exclusive and that the MsgNotifyMSF node (of FIG. 28) only made sense with the CM node. Requesting to insert the Foo node would result for instance in an implications window 290 as shown.

Selecting the "OK" button 290 will perform the changes. A similar scheme happens when deleting—the user selects the node to delete, the tool works out and displays the implications, the user accepts the implications, and the service is altered.

Possible execution graphs will vary depending on the rules that go with the edit graphs (in the full edit graph as explained earlier). Using the example from earlier on, possible execution graphs could be as shown in FIGS. 25a and 25a. The important point is that the only flexibility the SCE3 user has is changing the MSFs 403 in their graph—the MF(s) 406 always appear in the execution graph if the MSF 403 before it/them appears in the graph.

The user can work from a blank screen if it is defined as a valid state for a service to be in by the rules in its edit graph in the Service Package 404. This is a result of the constraint-based editing. What is more likely is that a service provider would create default, valid service configurations as template services (in exactly the same way as document templates in MS-word behave). The user would select "New" and then be presented with a list of templates to choose from. For example, "KTN with CM" or "KTN with Foo", to use the earlier example shown in FIG. 30. The template would include everything necessary for that service to run (MSFs and MFs) except for the explicit customer information that is special to that service (eg their phone number, where they want calls diverted to etc . . . ). This is entered by double-clicking on the icon 281, which brings up a form which allows the user to enter their details.

Embodiments of the present invention provide a Service Creation system that offers facilities useful to multiple types of different users. For instance, it allows marketing users to build complete service packages from service features, or to modify existing service packages for different markets. The system provides a pallet of Marketable Service Features which can be combined in a variety of ways to produce the logical flow of the Service Package. Every feature may have aspects of security, feature interaction avoidance, billing, and provision which have to be taken into account. The system can automate the building of provisioning screens, billing records, templates and all information needed for a service package to be deployed. This can then be made available to a distribution service which sends the service package to the nodes of the intelligent network, the various management systems that will run the service, and to the customer.

In use, a company may hear about a network operator's (BT for example) new service offering and request the service. initial provisioning information is loaded into the service management system of the network and the customer now has the service. The customer can then have a terminal, perhaps a personal computer, which will allow them to provision and change their own service data rather than using an operator of the network operator. They can create templates for different groups of users which will give them access to the appropriate level of service. They may also be able to change the service logic such as the order of options on a menu or which service takes precedence. The service creation system can be sufficiently flexible that the customer can have as much or as little control of a service, or in a service, as they feel necessary.

Although a three level service creation environment is described, this is not essential for embodiments of the present invention. The primary idea of the invention lies in the enabling of a graphical user interface where the user does not see the edit graph, or the whole of an edit graph, which in practice will constrain the user to create or develop a service to a fully tested and therefore usable structure.

Another type of service creation environment may indeed only have two different access points, one for the developer of the edit graphs, usually the service provider, and one for the customer and/or users. In such cases the code for the network elements may be supplied in some other way, for instance from or by a distributed computer environment from some remote source such as from the domain of a network provider who supports many service providers.

It might be noted in the above description that terminology such as "encapsulation" and "objects" is used. This type of terminology will be recognised as being simply the language of object oriented software engineering and programming and has the same meaning here as would be understood by a person skilled in the relevant technology.

Although as described above, the different service creation levels SCE1, SCE2, and SCE3 265 are separate environments, it may be the case that at least two of the levels are only logically separated. What may distinguish the service creation level 265c for the customer/user from the service creation level 265b for the service provider may simply be a logical separation in the form for instance of different access rights. In this case, it may be that MFs 406 actually have associated screen information which is visible to the service provider with access rights suitable to SCE2 265b but which is not visible to the customer with access rights suitable to SCE3 265c. In this case, the MFs 406 are effectively without screen information as far as the customer or user is concerned.

Package Text File Format.

16.1 Background

This section contains a description and an example of a text file version of a service package. The definition of the package it describes is documented within the Data Dictionary Control Document [7]. It should be stressed that the text file is not intended to supersede or preclude the ASN. 1 encoded version of the package delivered by SCE2. Instead, it is intended to complement this, by providing a simple yet powerful means of providing test packages without the overhead of ASN. 1. This allows the installation of packages to be tested before the ASN. 1 package is available from SCE2. It also provides a fall-back solution if, for some reason, the ASN. 1 versions of the package are not forthcoming.

16.1 BNF Description (BNF stands for "Backus Naun Form", a means of describing a grammar.)

16.2.1 Primary Productions

<Service Package>::=ServicePackage: <CMTag> <ObjectID> <FOTag> <IconID> <ProvScreen> <HelpInfoID> <Control> <ChargeID> <BillAgentID> <Resources> <MSFInv> <MFInv> <OrigEditGraph> <TermEditGraph> <TemplateInv> <TemplateInv>

<MSF>::=MSF: <CMTag> <SAFGraph> <SAFInventory> <IconID> <ProvScreen> <HelpInfoID> <ChargeID> <Control> <PackageID>

<MetaFeature>::=MetaFeature: <CMTag> <SAFGraph> <SAFInventory>

<ServiceProfile>::=ServiceProfile: <ObjectID> <Control> <PackageID> <IconID> <OrigExecGraph> <Term ExecGraph> <FPIList>

<UserPackage>::=UserPackage: <CMTag> <ObjectID> <PackageID> <ProvScreen> <HelpInfoID> <MSFinv> <TemplateInv> <ExecGraph>

<UserProfile>::=UserProfile: <ObjectID> <Control> <PackageID> <ProfileRefList> <OrigExecGraph> <FPIList>

16.2.2 Lexicon

```
<AttrList>::=<Attribute>|<AttrList> <Attribute>
<Attribute>::=Attribute: <string> Value: <string>
<BillAgentID>::=BillingAgentID: <oid>
<CMTag>::=CM Tag: <Name> Version: <string>
    DateTime: <string>
<ChargeID>::=ChargeID: <integer>
<Control>::=Control: <ControlID>
<ControlID>::=Disabled |Enabled
<DecisionPoint>::=DecisionPoint: <NodeRefList>
<DPList>::=<DecisionPoin>|<DPList> <DecisionPoint>
<DN>::=DN: <string>
<EditGraph>::=<EdNodeList>|<null>
<EdNode>::=EditNode: <NodeID> <View> <FlexPoint>
<EdNodeList>::=<EdNode>|<EdNodeList> <EdNode>
<ExecGraph>::=<ExNodeList>|<null>
<ExNode>::=ExecNode: <NodeID> <View> <DecisionPoint>
<ExNodeList>::=<ExNode>|<ExNodeList> <ExNode>
<FOTag>::=Associationind: <boolean>
<FPID>::=FPInstanceID: <integer>
<FPIList>::=FPIList: <FPICollection>
<FPICollection>::=<FPInstance>|<FPICollection>
    <FPInstance>
<FPInstance>::=FeatureProfileInstance: <FPID> <FProfile>
<FProfile>::=FeatureProfile: <SAFID> <SAFState>
<FlexPoint> FlexPoint: <DPList>
<Height>::=Height: <integer>
<HelpInfoID>::=HelpInfoID: <filename>
<IconID>::=IconID: <filename>
<MetaSP>::=MetaServiceProfile: <MetaSPBody>|<null>
<MetaSPBody>::=<ObjectID> <PackageID> <FPIList>
    <MFID> <string>
<MFInv>::=MFInventory: <MFList>|<null>
<MFList>::=<MetaFeature>|<MFList> <MetaFeature>
<MSFHandle>::=<MSFID> <WinPos>
<MSFID>::=<string>
<MSFInv>::=MSFInventory: <MSFList>|<null>
<MSFList ::=<MSF>|<MSFList> <MSF>
<Name>::=Name: <string>
<NodeHandle>::=
    <MSFHandle>|<MFID>|<SAFNodeIndex>
<NodeID>::=GraphNode: <NodeRef> <NodeType>
    <NodeHandle>
<NodeRef>::=NodeRef: <integer>|<endMarker>
<NodeRefList>:: <NodeRef>|<NodeRefList>
    <NodeRef>
<NumSucc>::=NumSucc: <integer>
<NodeType>::=NodeType: <NodeTypeID>
<NodeTypeID>::=MSF |MF |SAF
<ObjectID>::=OID: <oid>|<null>
<OpName>::=OperationID: <string>
<OrigEditGraph>::=OrigEditGraph: <EditGraph>
<OrigExecGraph>::=OrigExecGraph: <ExecGraph>
<PackageID>::=PackageID: <old>|<null>
<Param>::=Param: <SceneTag>
<ParamList>::=<Param>|<ParamList> <Param>
<Position>::=<XCoord> <Ycoord> <Height> <Width>
<Profile>::=<ServiceProfile>|<UserProfile> <MetaServiceProfile>
<ProfileFileName>::=FileName: <filename>
<ProfileRef>::=ProfileRef: <DN> <ObjectID> <PackageID>
ProfileRefList>::=<ProfileRef>|<ProfileRefList> <ProfileRef>
<ProvScreen>::=ProvScreen: <filename>
<Resources>::=ServiceResources: MaxUsers: <integer>
    MaxSimCalls: <integer>
<Return>::=Return: <SceneTag>
<ReturnList>::=<Return>|<ReturnList> <Return>
<SAFGraph>::=SAFGraph: <ExecGraph>
<SAFID>::=SAFID: <string>
<SAFInventory>::=SAFInventory: <SAFNodes>
<SAFNodes>::=SAFNode: <SAFID> <FPID>
    <OpName> <ParamList> <ReturnList> <Scope>
<SAFNodeIndex>::=SAFNodeIndex: <integers>
<SAFNodes>::=<SAFNode>|<SAFNodes> <SAFNode>
<SAFState>::=SAFState: <AttrList>
<SceneTag>::=<integer>|<null>
<Scope>::=Scope: <ScopeID>
<ScopeID>::=User |Service |VN |BT |Call |NoScope
<Template>::=Template: <Name> <ProfileFileName>
    <Profile>
<TemplateInv>:: TemplateInventory:
    <TemplateList>|<null>
<TemplateList>::=<Template>|<TemplateList> <Template>
<TermEditGraph>::=TermEditGraph: <EditGraph>
<TermExecGraph>::=TermExecGraph: <ExecGraph>
<Width>::=Width: <integer>
<WinPos>::=WindowPos: <Position>|<null>
<View>::=View: <string>
<XCoord>::=topX: <integer>
<YCoord>::=topY: <integer>
<boolean> True |False
<alphaNum>::='a'–'z'|'A'–'Z'|'0'–'9'
<alphaNums>::=<alphaNum>|<alphaNums> <alphaNum>
<char>::=<aphaNum>|<whitespace>
<chars>::=<char>|<chars> <char>
<comments>::=//<chars>
<digit>::='0'–'9'
<digits>::=<digit>|<digits> <digit>
<endMarker>::=END
<filename>::=<quote> <alphaNums> <quote>|<quote>
    <alphaNums>.<alphaNums> <quote>
<integer>::=<digits>|<nullMarker>
<null>::=''|\n
<nullMarker>::=NULL
<old>::=<integer>|<old>.<integer>
<quote>::='''//this is a single quote!
<string>::=<quote> <chars> <quote>
<whitespace>::=<null>|\t
```

16.3 Service Package Example

The example service chosen is a very simple one. In fact, all it does is play a broadcast message (which is the same for all service users), optionally play a welcome message and then call another service. If the welcome message is played, then the user asked for authorisation. Note that the Authorise feature is a meta-feature in this example.

In the SCE3 view of this graph, the meta-feature would not be visible. It is assumed that the service package contains two template service profiles, one for each possible edit graph.

```
// @ (II) servPack.ex1.13 9/15/94
ServicePackage
    CHTag:
        Name: 'test service package'
        Version: '1.13'
        DateTime: '9/15/94'
    OID: 0.1.2.3.4.5.6
    AssociationInd: False
    IconID: 'testpackage.xbm'
    ProvScreen: 'testpackage.url'
    HelpInfoID: 'testpackage.hlp'
    Control: Enabled
    ChargeID: 3
    BillingAgentID: 0.5.0.0.1
    ServiceResources:
        MaxUsers: 999
        MaxSimCalls: 999
```

(The following is a definition of an MSF containing a single SAF:)

```
MSFInventory:
    MSF:
        CMTag:
            Name: 'welcomeMSF'
            Version: '1.0'
            DateTime: '17 June 1994 10:40 GMT'
        SAFGraph:
            ExecNode:
                GraphNode:
                    NodeRef: 1
                    NodeType: SAF
                    SAFNodeIndex: 0
                    View: 'this is where a view would go'
                    DecisionPoint:
                        NodeRef:
                        SAFInventory:
                SAFNode:
                    SAFID: 'playMessage'
                    FPInstanceID: 2
                    OperationID: 'play'
                    Param: 1
                    Return: 2
                    Scope: User
        IconID: 'myMSF.xbm'
        ProvScreen: 'myMSF.url'
        HelpInfoID: 'myMSF.hlp'
        ChargeID: 3
        Control: Enabled
        PackageID:
    MSF:
        CMTag:
            Name: 'followOnMSF'
            Version: '1.0'
            DateTime: '17 June 1994 10:40 GMT'
        SAFGraph:
            ExecNode:
                GraphNode:
                    NodeRef: 1
                    NodeType: SAF
                    SAFNodeIndex: 0
                    View: 'a view'
                    DecisionPoint:
                        NodeRef:
                        SAFInventory:
                SAFNode:
                    SAFID: 'followOn'
                    FPInstanceID: 3
                    OperationID: 'next'
                    Param:
                    Return:
                    Scope: User
        IconID: 'followMSF.xbm'
        ProvScreen: 'followonMSF.url'
        HelpInfoID: 'followonMSF.hlp'
        ChargeID: 2
        Control: Enabled
        PackageID: 0.1.2.3.4.5.6
    MSF:
        CMTag:
            Name: 'broadcastMSF'
            Version: '1.0'
            DateTime: '17 June 1994 10:40 GMT'
        SAFGraph:
            ExecNode:
                GraphNode:
                    NodeRef: 1
                    NodeType: SAF
                    SAFNodeIndex: 0
                    View: 'a view'
                    DecisionPoint:
                        NodeRef: END
                        SAFInventory:
                SAFNode:
                    SAFID: 'broadcast'
                    FPInstanceID: 5
                    OperationID: 'set'
                    Param:
                    Return:
                    Scope: Service
        IconID: 'broadcastMSF.xbm'
        ProvScreen: 'broadcastMSF.url'
        HelpInfoID: 'broadcastMSF.hlp'
        ChargeID: 0
        Control: Enabled
        PackageID:
MFInventory:
    (The following is a definition of an MF containing a single SAF:)
    MetaFeature:
        CMTag:
            Name: 'authoriseMF'
            Version: '1.0'
            DateTime: '21 June 1994 11:55 GMT'
        SAFGraph:
            ExecNode:
                GraphNode:
                    NodeRef: 1
                    NodeType: SAF
                    SAFNodeIndex: 0
                    View: 'a view'
                    DecisionPoint:
                        NodeRef: END
                        SAFInventory:
                SAFNode:
                    SAFID: 'sentinal'
                    FPInstanceID: 1
                    OperationID: 'authorise'
                    Param:
                    Return:
                    scope: User
        OrigEditGraph:
            EditNode:
                GraphNode:
                    // Broadcast MSF
                    NodeRef: 1
                    NodeType: MSF
                    MSFID: 'broadcastMSF'
                    WindowPos:
                        topX: 0
                        topY. 0
                        Height: 60
                        Width: 60
                    View: 'TRUE'
                FlexPoint:
```

```
            DecisionPoint:
                NodeRef: 2
            DecisionPoint:
                NodeRef: 4
        EditNode:
            GraphNode:
                // welcome MSF
                NodeRef: 2
                NodeType: MSF
                MSFID: 'welcomeMSF'
                WindowPos:
                    topX: 0
                    topY: 100
                    Height: 60
                    Width: 60
                View: 'TRUE'
            FlexPoint:
                Decision Point:
                    NodeRef: 3
        EditNode:
            GraphNode:
                // authorise MF
                NodeRef: 3
                NodeType: MF
                MFID: 'authoriseMF'
                View: 'TRUE'
            FlexPoint:
                DecisionPoint:
                    NodeRef: 4
        EditNode:
            GraphNode:
                // follow-on MSF
                NodeRef: 4
                NodeType: MSF
                MSFID: 'followOnMSF'
                WindowPos:
                    topX: 0
                    topY: 200
                    Height: 60
                    Width: 60
                View: 'TRUE:
            FlexPoint:
                DecisionPoint:
                    NodeRef: END
TermEditGraph:
TemplateInventory:
Template:
    Name: 'With welcome message'
    FileName: 'welcome.tmp'
    ServiceProfile:
        OID:
        Control: Enabled
        PackageID: 0.1.2.3.4.5.6
        IconID: 'profile1.xbm'
        origExecGraph:
            ExecNode:
                GraphNode:
                    // Broadcast MSF
                    NodeRef: 1
                    NodeType: MSF
                    MSFID: 'broadcastMSF'
                    WindowPos:
                        topX: 0
                        topY: 0
                        Height: 60
                        Width: 60
                    View: ' '
                DecisionPoint:
                    NodeRef: 2
            ExecNode:
                GraphNode:
                    // welcome MSF
                    NodeRef: 2
                    NodeType: MSF
                    MSFID: 'welcomeMSF'
                    WindowPos:
                        topX: 0
                        topY: 100
                        Height: 60
                        Width: 60
                        View: ' '
                    DecisionPoint:
                        NodeRef: 3
                ExecNode:
                    GraphNode:
                        // authorise MF
                        NodeRef: 3
                        NodeType: MF
                        MFID: 'authoriseMF'
                        View: ' '
                    DecisionPoint:
                        NodeRef: 4
                ExecNode:
                    GraphNode:
                        // follow-on MSF
                        NodeRef: 4
                        NodeType: MSF
                        MSFID: 'followOnMSF'
                        WindowPos:
                            topX: 0
                            topY: 200
                            Height: 60
                            width: 60
                        View: ' '
                    DecisionPoint:
                        NodeRef: END
        TermExecGraph: - Null
        FPIList:
            FeatureProfileInstance:
                FPInstanceID: 2
                FeatureProfile:
                    SAFID: 'playMessage'
                    SAFState:
                        Attribute: 'messageFile' Value:
                                  'welcome.audio'
            FeatureProfileInstance:
                FPInstanceID: 3
                FeatureProfile:
                    SAFID: 'followOn'
                    SAFState:
                        Attribute: 'followOnService' Value:
                                  '0.1.0.2.1'
Template:
    Name: 'Without welcome message'
    FileName: 'noWelcome.tmp'
    ServiceProfile:
        OID:
        Control: Enabled
        PackageID: 0.1.2.3.4.5.6.6
        IconID: 'profile2.xbm'
        OrigExecGraph:
            ExecNode:
                GraphNode:
                    // Broadcast MSF
                    NodeRef: 1
                    NodeType: MSF
                    MSFID: 'broadcastMSF'
                    WindowPos:
                        topX: 0
                        topY: 0
                        Height: 60
                        Width: 60
                    View: ' '
                DecisionPoint:
                    NodeRef: 4
            ExecNode:
                GraphNode:
                    // follow-on MSF
                    NodeRef: 4
                    NodeType: MSF
                    MSFID: 'followonMSF'
                    WindowPos:
                        topX: NULL
                        topY: 200
                        Height: 60
                        Width: 60
                    View: ' '
                DecisionPoint:
```

-continued

```
            NodeRef: END
    TermExecGraph:
    FPList:
        FeatureProfileInstance:
            FPInstanceID: 3
            FeatureProfile:
                SAFID: 'followon'
                SAFState:
TemplateInventory:
Template:
    Name: 'Service-scoped data'
    FileName: 'metaSP.tmp'
    MetaServiceProfile:
        OID: 0.1.2.3.4.5.6.7
        PackageID: 0.1.2.3.4.5.6
        FPIList:
            FeatureProfileInstance:
                FPInstanceID: 1
                FeatureProfile:
                    SAFID: 'authorise'
                    SAFState:
                    Attribute: 'minPINLength' Value: '2'
                    Attribute: 'maxPINLength' Value: '4'
            FeatureProfileInstance:
                FPInstanceID: 5
                FeatureProfile:
                    SAFID: 'broadcast'
                    SAFState:
                    Attribute: 'message' Value: 'broadcast.
                        audio'
                    Attribute: 'status' Value: 'active'
```

What is claimed is:

1. Service creation apparatus for a communications network in which communications services can be created or modified by screen-based manipulation of ordered sequences of units of code, the system providing a service by running such an ordered sequence of units of code in accordance with an execute graph, wherein the system comprises:

i) an interface for use in accessing stored units of code;
   ii) means to select a set of units of code from those stored;
   iii) means to create or modify an edit graph, the edit graph determining at least in part the ordered sequence associated with a set of units of code for the provision of a communications service;
   iv) means to associate an edit graph with visual information for use by a user on a graphical user interface in editing or modifying the edit graph to produce an execute graph; and
   v) means to supply the edit graph together with the visual information to the graphical user interface;
   wherein the means to supply the edit graph together with visual information is adapted to supply at least one edit graph without visual information such that an execute graph can be produced from the edit graph without the edit graph being visible, or with the edit graph being only partially visible, to the user.

2. Apparatus according to claim 1, wherein the apparatus further comprises more than one level of service creation environment, wherein at least two of said levels are each provided with means to generate or access different respective types of software entity, wherein a first of said levels has means to generate or access service application features which comprise software objects which can be deployed in elements of the network, and a second of said levels has means to generate or access marketable service features, each marketable service feature comprising a reference to one or more service application features of the first level, together with graphical definition data for modifying or inputting provisionable aspects of said service application features by means of a graphical interface, and said second level further has means to generate or access service packages, communicable to a third of said levels, at least one service package comprising a set of marketable service features or references to a set of marketable service features, together with an edit graph.

3. Apparatus according to claim 2 wherein each edit graph comprises a set of references to files, each file comprising at least one of the units of code.

4. Apparatus according to either one of claim 2 wherein said second level further has means to generate or access metafeatures, each metafeature referencing one or more service application features of the first level but not including graphical definition data such that a user at the third level is not provided with interface information for modification purposes in respect of any metafeature.

5. Apparatus according to claim 4 wherein at least one service package may comprise a set of marketable service features, or references thereto, together with one or more metafeatures, or references thereto.

6. Apparatus according to either one of claim 4 wherein at least one service package may comprise a set of metafeatures, or references thereto, and no marketable service features, or references thereto.

7. A method of providing edit facilities for use in customising a communications service to be provided to a user over a communications network, which method comprises:

a) generating an edit graph for the service, which edit graph comprises a set of nodes representing zero or more marketable service features and at least one metafeature, linked in a preselected relationship, each marketable service feature identifying one or more executable units of code for use in providing the service at run-time, and comprising screen information for use by the user in customising a service by use of the graph, and each metafeature identifying one or more executable units of code for use in providing the service at run-time;
   b) making the edit graph so generated available to a user; and
   c) receiving an execute graph for use in provision of the service, which execute graph comprises the edit graph customised by at least one user data input, wherein said edit graph available to the user excludes screen information with respect to any metafeature such that the metafeature(s) are not visible to the user.

8. A method according to claim 7 wherein said edit graph made available to the user includes at least one marketable service feature.

9. A method according to either one of claim 7 which further comprises the selection of marketable service features to be available to a user in association with the edit graph and providing screen information to the user for use in selecting and inserting marketable service features from the selection into the edit graph.

10. A method according to claim 7 wherein the screen information comprises icon data for displaying an icon identifying a relevant marketable service feature.

11. A method according to claim 7 wherein at least part of the screen information comprises form information for use by the user in generating the execute graph from the edit graph.

* * * * *